United States Patent
Kober et al.

(10) Patent No.: US 6,430,216 B1
(45) Date of Patent: Aug. 6, 2002

(54) RAKE RECEIVER FOR SPREAD SPECTRUM SIGNAL DEMODULATION

(75) Inventors: Wolfgang Kober, Aurora; John K. Thomas, Erie; Marvin L. Vis, Longmont, all of CO (US)

(73) Assignee: Data Fusion Corporation, Northglenn, CO (US)

(*) Notice: Subject to any disclaimer, the term of this patent is extended or adjusted under 35 U.S.C. 154(b) by 0 days.

(21) Appl. No.: 09/612,602

(22) Filed: Jul. 7, 2000

Related U.S. Application Data

(63) Continuation of application No. 08/916,884, filed on Aug. 22, 1997.

(51) Int. Cl.[7] .......................... H04B 1/707; H04B 1/10; H04B 7/216; H04L 1/02

(52) U.S. Cl. .................... 375/148; 375/150; 375/346; 375/347; 370/342

(58) Field of Search ............................... 375/148, 147, 375/144, 142, 150, 343, 346, 347, 349, 267; 370/335, 342, 320, 441; 455/269, 272, 273, 278.1

(56) References Cited

U.S. PATENT DOCUMENTS

| | | | |
|---|---|---|---|
| 4,359,738 A | 11/1982 | Lewis | 342/379 |
| 4,665,401 A | 5/1987 | Garrard et al. | 342/75 |
| 4,780,885 A | 10/1988 | Paul et al. | 375/267 |

(List continued on next page.)

FOREIGN PATENT DOCUMENTS

| | | |
|---|---|---|
| DE | 4201 439 A1 | 7/1993 |
| DE | 4326 843 A1 | 2/1995 |
| DE | 4343 959 A1 | 6/1995 |
| GB | 2280 575 A | 1/1995 |
| JP | 7-74687 | 3/1995 |
| WO | WO 93/12590 | 6/1993 |

OTHER PUBLICATIONS

J. G. Ortega et al., "Analog to Digital and Digital to Analog Conversion based on Stochastic Logic"; 9/1995; pp. 995–999.

Harper et al.; "Digita –to–Analog Conversion by Pulse–Cont Modulation Methods"; 8/1996.

Lin et al.; "Digital Filters for High Performance Audio Delta–Sigma Analog–to Digital and Digital–to Analog Conversions"; 1/1996; pp. 59–63.

Frankel et al.; "High–Performance Photonic Analogue–Digital Converter"; 12/97; 2096–2097.

Scharf and Friedlander; "Matched Subspace Detectors"; *IEEE Transactions on Signal Processing*; vol. 42, No. 8, Aug. 1994; pp. 2146–2157.

Behrens and Scharf; "Signal Processing Applications of Oblique Projection Operators"; *IEEE Transactions on Signal Processing*; June 1994; pp. 1413–1424.

Schlegel et al.; "Multiuser Projection Receivers", *IEEE Journal on Selected Areas in Communications*, vol. 14 No. 8; Oct. 1996; pp. 1610–1618.

Schlegel et al.; "Coded Asynchronous CDMA and Its Efficient Detection", *IEEE Transactions on Information Theory*, vol. 44 No. 7; Nov. 1998; pp. 2837–2847.

(List continued on next page.)

*Primary Examiner*—Betsy L. Deppe
(74) *Attorney, Agent, or Firm*—Sheridan Ross PC

(57) ABSTRACT

The architecture of the present invention is premised upon an algorithm involving integration of oblique correlators and RAKE filtering to null interference from other spread spectrum signals. The oblique correlator is, of course, based on the non-orthogonal projections that are optimum for nulling structured signals such as spread spectrum signals. RAKE filtering is used to rapidly steer the beam of the multi-antenna system and to mitigate the effects of multipath.

142 Claims, 11 Drawing Sheets

U.S. PATENT DOCUMENTS

| | | | |
|---|---|---|---|
| 4,852,166 A | 7/1989 | Masson | 380/36 |
| 4,856,025 A | 8/1989 | Takai | 375/267 |
| 4,893,316 A | 1/1990 | Jane et al. | 708/300 |
| 4,922,506 A | 5/1990 | McCallister et al. | 375/142 |
| 4,933,639 A | 6/1990 | Barker | 324/309 |
| 4,965,732 A | 10/1990 | Roy, III et al. | 342/147 |
| 5,099,493 A | 3/1992 | Zeger et al. | 370/342 |
| 5,109,390 A | 4/1992 | Gilhousen et al. | 370/335 |
| 5,119,401 A | 6/1992 | Tsujimoto | 375/233 |
| 5,151,919 A | 9/1992 | Dent | 370/209 |
| 5,218,619 A | 6/1993 | Dent | 370/209 |
| 5,220,687 A | 6/1993 | Ichikawa et al. | 455/254 |
| 5,224,122 A | 6/1993 | Bruckert | 375/148 |
| 5,237,586 A | 8/1993 | Bottomley | 370/206 |
| 5,263,191 A | 11/1993 | Dickerson | 455/304 |
| 5,280,472 A | 1/1994 | Gilhousen et al. | 370/335 |
| 5,305,349 A | 4/1994 | Dent | 370/209 |
| 5,325,394 A | 6/1994 | Bruckert | 375/148 |
| 5,347,535 A | 9/1994 | Karasawa et al. | 370/342 |
| 5,353,302 A | 10/1994 | Bi | 370/342 |
| 5,355,533 A | 10/1994 | Dickerson | 455/306 |
| 5,386,202 A | 1/1995 | Cochran et al. | 332/100 |
| 5,390,207 A | 2/1995 | Fenton et al. | 375/149 |
| 5,394,110 A | 2/1995 | Mizoguchi | 329/304 |
| 5,394,434 A | 2/1995 | Kawabe et al. | 370/342 |
| 5,412,391 A | 5/1995 | Lewis | 342/379 |
| 5,437,055 A | 7/1995 | Wheatley, III | 455/562 |
| 5,440,265 A | 8/1995 | Cochran et al. | 329/300 |
| 5,481,570 A | 1/1996 | Winters | 709/220 |
| 5,513,176 A | 4/1996 | Dean et al. | 370/335 |
| 5,553,098 A | 9/1996 | Cochran et al. | 375/324 |
| 5,602,833 A | 2/1997 | Zehavi | 370/209 |
| 6,177,893 B1 | 1/2001 | Velazquez et al. | 341/118 |

OTHER PUBLICATIONS

Schlegel et al.; "A New Projection Receiver for Coded Synchronous multi–User CDMA Systems"; p. 318.

Alexander et al.; "A Linear Receiver for Coded multiuser CDMA"; *IEEE Transactions on Communications,* vol. 45 No. 5; May 1997; pp. 605–610.

Schlegel et al.; "Projection Receiver: A New Efficient Multi–User Detector"; *IEEE;* 5/95; pp. 142–145.

Behrens; "Subspace Signal Processing in Structured Noise", *UMI Dissertation Services;* 1990; 145 pages.

John K. Thomas; Thesis for the Doctor of Philosophy Degree; 1996; 110 pages.

*PHASED RAKE PROCESSING*

RAKE RECEIVER FOR SPREAD SPECTRUM SIGNAL DEMODULATION

CROSS REFERENCE TO RELATED APPLICATIONS

The present application is a continuation of U.S. patent application Ser. No. 08/916,884, filed Aug. 22, 1997, of the same title which, claims priority from U.S. Provisional Application entitled "PHASED-RAKE RECEIVER FOR SIGNAL DEMODULATION", having Ser. No. 60/024,525 and filed Aug. 23, 1996, which is incorporated fully herein by reference.

FIELD OF THE INVENTION

The present invention is generally directed to a system for receiving a spread spectrum signal and specifically to a system for receiving and demodulating a spread spectrum signal.

BACKGROUND OF THE INVENTION

Spread spectrum techniques are finding larger roles in a variety of applications. In cellular telephony, spread spectrum based systems offer the potential for increased efficiency in the use of bandwidth. The resistance of spread spectrum methods to jamming make them ideally suited for radar and Global Positioning System (GPS) applications. For radar applications, spread spectrum signals have a lower probability of being intercepted due to the noise-like appearance of spread spectrum waveforms. In addition, it may be used to increase the pulse repetition frequency without sacrificing unambiguous range.

In spread spectrum radars, GPS, and cellular telephony applications (e.g., Code Division Multiple Access (CDMA)), each transmitted signal or pulse is assigned a time varying pseudo-random code that is used to spread each bit in the digital data stream (i.e., an interference code), such as the long code and PN code in CDMA applications. In CDMA applications, this spreading causes the signal to occupy the entire spectral band allocated to the Multiple Access System (MAS). The different users in such a system are distinguished by unique interference codes assigned to each. Accordingly, all users simultaneously use all of the bandwidth all of the time and thus there is efficient utilization of bandwidth resources. In addition, since signals are wide-band, the multipath delays can be estimated and compensated for. Finally, by carefully constructing interference codes, base stations can operate with limited interference from adjacent base stations and therefore operate with higher reuse factors (i.e., more of the available channels can be used).

In spread spectrum systems, all other spread spectrum signals contribute to background noise, or interference, relative to a selected spread spectrum signal. Because each user (or radar pulse or GPS satellite signal) uses a noise-like interference code to spread the bits in a signal, all the users contribute to the background noise. In CDMA systems in particular, user generated background noise, while having a minimal effect on the forward link (base-to-mobile) (due to the synchronized use of orthogonal Walsh Codes), has a significant effect on the reverse link (mobile to base)(where the Walsh Codes are commonly not synchronized and therefore nonorthogonal). The number of users a base-station can support is directly related to the gain of the antenna and inversely related to the interference. Gain is realized through the amplification of the signal from users that are in the main beam of the antenna, thereby increasing the detection probability in the demodulator. Interference decreases the probability of detection for a signal from a given user. Although "code" filters are used to isolate selected users, filter leakage results in the leakage of signals of other users into the signal of the selected user, thereby producing interference. This leakage problem is particularly significant when the selected user is far away (and thus the user's signal is weak) and the interfering user is nearby (and thus the interfering user's signal is strong). This problem is known as the near-far problem.

There are numerous techniques for improving the signal-to-noise ratio of spectrum signals where the noise in the signal is primarily a result of interference caused by other spread spectrum signals. These techniques primarily attempt to reduce or eliminate the interference by different mechanisms.

In one technique, the interfering signals are reduced by switching frequency intervals assigned to users. This technique is useless for the intentional jamming scenario in which jammers track the transmitter frequencies. Frequency switching is not an option for the CDMA standard for cellular telephones. In that technology, all users use all of the frequencies at all times. As a result there are no vacant frequency bands to switch to. In another technique, the interfering signals are selectively nulled by beam steering. Classical beam steering, however, does not provide, without additional improvements, the required angular resolution for densely populated communications environments.

The above techniques are further hampered due to the fact that signals rarely travel a straight line from the transmitter to the receiver. In fact, signals typically bounce off of buildings, trees, cars, etc., and arrive at the receiver from multiple directions. This situation is referred to as the multipath effect from the multiple paths that the various reflections that a signal takes to arrive at the receiver.

SUMMARY OF THE INVENTION

An objective of the present invention is to provide a system architecture for increasing the signal-to-noise ratio (SNR) of a spread spectrum signal. Another objective is to provide a system architecture for removing the interference from a spread spectrum signal, particularly the interference attributable to spread spectrum signals generated by other sources. Yet another objective is to provide a system architecture for removing the interference from a spread spectrum signal that does not employ beam steering. Specific related objectives include providing a demodulating/decoding system for efficiently demodulating/decoding spread spectrum signals generated by far away sources in the presence of spread spectrum signals generated by near sources and/or effectively accounting for the various multipaths of a spread spectrum signal.

These and other objectives are addressed by the spread spectrum system architecture of the present invention. In a first configuration of the present invention, the system includes: (i) an antenna adapted to receive a signal that is decomposable into a first signal segment and a second signal segment, the first signal segment of the signal being attributable to a first source and the second signal segment of the signal being attributable to a source other than the first source; and (ii) an oblique projecting device, in communication with the antenna, for determining the first signal segment. The signal can be any structured signal, such as a spread spectrum signal. A "structured signal" is a signal that has known values or is created as a combination of signals of known values.

The oblique projecting device determines the first signal segment by obliquely projecting a signal space spanned by the signal onto a first space spanned by the first signal segment. As used herein, the "space" spanned by a set "A" of signals is the set of all signals that can be created by linear combinations of the signals in the set "A". For example, in spread spectrum applications, the space spanned by the signals in set "A" are defined by the interference codes of the one or more selected signals in the set. Thus the space spanned by interfering signals is defined by all linear combinations of the interfering signals. The signal space can be obliquely projected onto the axis along a second space spanned by the second signal segment. The estimated parameters of the first signal segment are related to the actual parameters of the first signal segment and are substantially free of contributions by the second signal segment. Through the use of oblique projection, there is little, if any, leakage of the second signal segment into computed parameters representative of the first signal segment.

For spread spectrum applications where noise characteristics are quantifiable, oblique projection is preferably performed utilizing the following algorithm:

$$(I-S(S^TS)^{-1}S^T)H(H^T(I-S(S^TS)^{-1}S^T)H)^{-1}H^T(I-S(S^TS)-1S^T)$$

and hypothetical correlation functions generated using the following equation:

$$(y^T(I-S(S^TS)^{-1}S^T)H(H^T(I-S(S^TS)^{-1}S^T)H)^{-1}H^T(I-S(S^TS)^{-1}S^T)y)/\sigma^2$$

where y corresponds to a selected portion of the spread spectrum signal, H corresponds to an interference code matrix for the first signal segment (which defines a first space including the first signal), S corresponds to the interference code matrices for signals of all of the other sources (users) in the selected portion of the spread spectrum signal (which defines a second space including the signals of the other sources), $^T$ corresponds to the transpose operation, I is the identity matrix, and $\sigma^2$ corresponds to the variance of the magnitude of the noise in the selected portion of the spread spectrum signal. Where noise is present, a substantial portion of the noise may be generated by the receiver:

$$(y^T(I-S(S^TS)^{-1}S^T)H(H^T(I-S(S^TS)^{-1}S^T)H)^{-1}H^T(I-S(S^TS)^{-1}S^T)y)/\sigma^2$$

The system can have a number of advantages, especially in spread spectrum systems. The system can significantly increase the signal-to-noise ratio (SNR) of the spread spectrum signal relative to conventional spread spectrum demodulating systems, thereby increasing the detection probability. This is realized by the almost complete removal (i.e., nulling) from the spread spectrum signal of interference attributable to spread spectrum signals generated by other sources. Non-orthogonal (oblique) projections are optimum for nulling structured signals such as spread spectrum signals. In CDMA systems, the system can efficiently demodulate/decode spread spectrum signals generated by far away (weak) sources in the presence of spread spectrum signals generated by near (strong) sources, thereby permitting the base station for a given level of signal quality to service more users and operate more efficiently. An improvement in SNR further translates into an increase in the user capacity of a spectral bandwidth—which is a scarce resource. Unlike conventional systems, the system does not require beam steering to remove the interference.

In applications where the first signal includes a number of multipath signal segments, the system can include a threshold detecting device, in communication with the oblique projecting device, for generating timing information defining a temporal relationship among the plurality of multipath signal segments (e.g., using mathematical peak location techniques that find the points at which the slope of the surface changes from positive to negative and has a large magnitude) and a timing reconciliation device for determining a reference time based on the timing information (i.e., the multipath delays). Multipath signal segments correspond to the various multipaths followed by a signal (e.g., the first signal) after transmission by the signal source.

The system can include a RAKE processor in communication with the oblique projecting device and the timing reconciliation device for aligning the plurality of multipath signal segments in at least one of time and phase and/or scaling the magnitude(s) of the multipath signal segments. RAKE processing rapidly steers the beam of a multi-antenna system as well as mitigates multipath effects. The RAKE processor preferably aligns and scales using the following algorithm:

$$y_R(K) = \frac{1}{\sum_{i=1}^{p} A_i} \sum_{i=1}^{p} A_i e^{-j\phi i} y(k+t_i)$$

where p is the number of the multipath signal segments (or peaks); i is the number of the multipath signal segment; $A_i$ is the amplitude of ith multipath signal segment; j is the amount of the phase shift; $\phi_i$ is the phase of the ith multipath signal segment; y(k) is the input sequence; and $t_i$ is the delay in the received time for the ith multipath signal segment.

The RAKE processor effectively focuses the beam on the desired signal source. The oblique projecting device and RAKE processor null out the signals of other sources in the spread spectrum signal and thereby eliminate the need for null steering to be performed by the antenna. The system of the present invention is less complex and more efficient than conventional beam steering systems.

The system can include a demodulating device in communication with the RAKE processor to demodulate each of the signal segments. Like the oblique projecting device, the demodulating device uses the equation noted above with respect to the oblique projecting device. Unlike the oblique projecting device which uses portions of the filtered signal to perform oblique projection, the demodulating device uses the output of the RAKE processor which has aligned and summed all of the multipath signal segments. Both the oblique projecting and demodulating devices use estimates of the transmission time ("trial time") and symbol ("candidate symbol") and the receive time in determining a correlation function using the above equation. "Receive time" is the index into the received data stream (or spread spectrum signal) and represents the time at which the data (or spread spectrum signal) was received by the antenna. "Transmission time" is the time at which the source transmitted a selected portion of the data stream (i.e., the selected signal).

In another configuration, the system includes a plurality of antennas (i.e., an antenna array), with each antenna having a respective oblique projecting device, threshold detecting device, and RAKE processor. A common timing reconciliation device is in communication with each of the respective threshold detecting devices and RAKE processors. A common demodulating component is also in communication with each of the RAKE processors. In this configuration, the demodulating component sums all of the first signals received by each of the antennas to yield a corrected first signal reflecting all of the various multipath signal segments related to the first signal.

In either configuration, the system can effectively accommodate the various multipath signal segments related to a source signal. The RAKE processor weights each of the multipath signal segments in direct relation to the magnitude of the peak defined by each multipath signal segment.

The above description of the configurations of the present invention is neither complete nor exhaustive. As will be appreciated, other configurations are possible using one or more of the features set forth above.

DETAILED DESCRIPTION

The present invention provides a software architecture and the underlying mathematical algorithms for demodulating/decoding communications signals containing interference noise. This invention is generally applicable to CDMA systems (and other spread spectrum systems), Frequency Division Multiple Access systems (FDMA) and Time Division Multiple Access systems (TDMA) and particularly for spread spectrum systems, such as CDMA. In spread spectrum systems, interference noise is typically due to a dense population of signals using the same intervals of the frequency spectrum, such as in high user density cellular phone applications, or such as in the intentional interference of radar or communication signals by nearby jammers.

Single Antenna Systems

Figure 1:
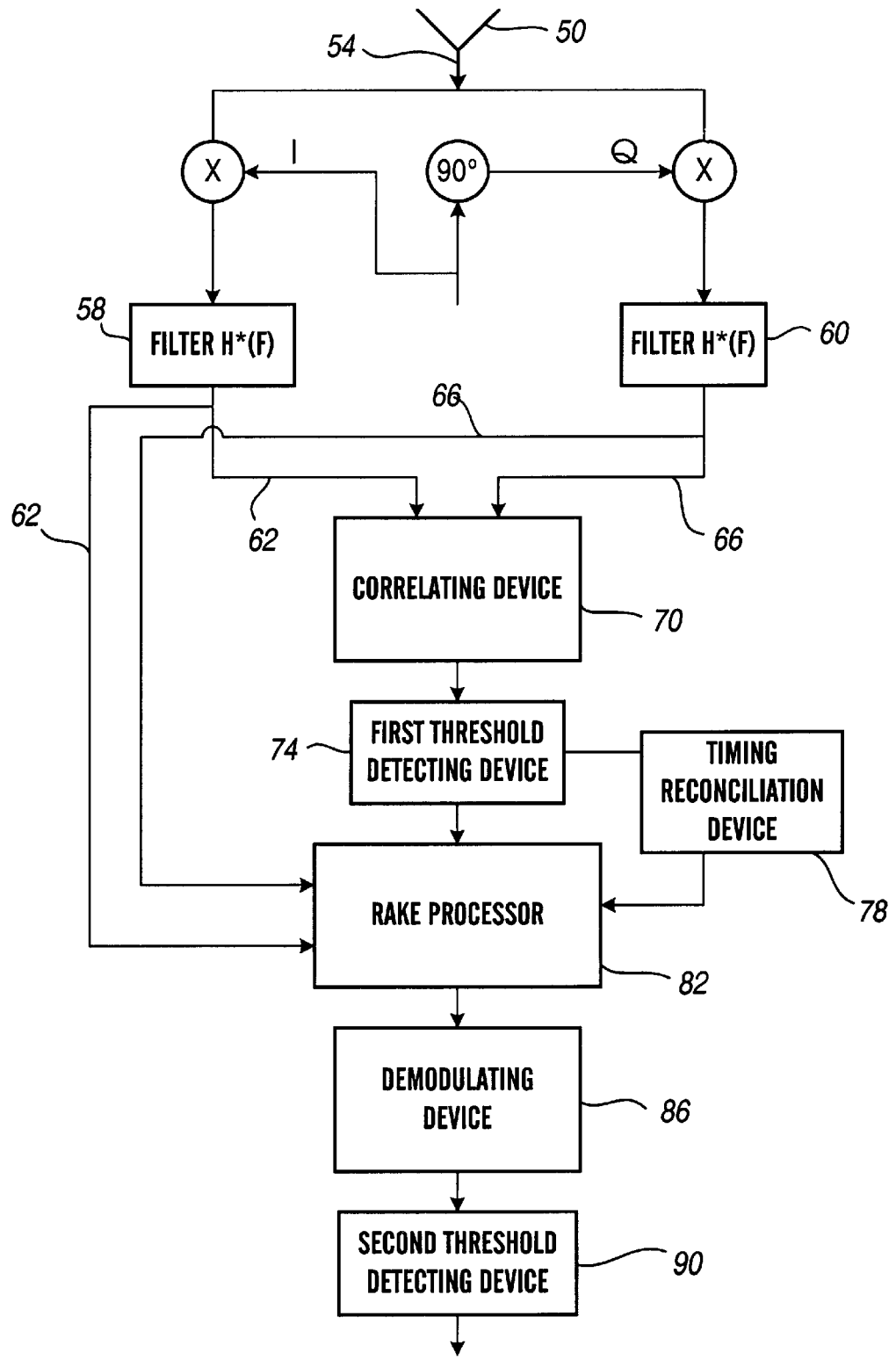
FIG. 1 is a first embodiment of the present invention.

An overview of the current architecture for detecting signals from an ith user in a CDMA system is illustrated in FIG. 1. The architecture employs a single antenna for receiving CDMA signals. The system includes the antenna 50 adapted to receive the spread spectrum signal and generate an output signal 54, filters 58 and 60 for filtering the in-phase ("I") and quadrature ("Q") channels to form filtered channel signals 62 and 66, a correlating device 70 for providing a hypothetical correlation function characterizing a filtered signal segment, which may be multipath signal segment(s) of a source signal (hereinafter collectively referred to as a "signal segment"), transmitted by a selected user, a first threshold detecting device 74 for generating timing information defining the temporal relationship among a plurality of peaks defined by the hypothetical correlation function, a timing reconciliation device 78 for determining a reference time based on the timing information, a RAKE processor 82 for aligning multipath signal segments for each selected user in time and phase and outputting an aligned signal for the selected user, a demodulating device 86 for demodulating aligned signals transmitted by each selected user into correlation functions and, finally, a second threshold detecting device 90 for converting the correlation functions into digital information. As will be appreciated, a system configured for radar or GPS applications will not include some of these components, such as the filters 58 and 60.

The antenna can be of any suitable configuration for receiving a structured signal and providing the output signal based thereon, such as an antenna having one or a number of antenna elements. As will be appreciated, the output signal is a mix of a plurality of signal segments transmitted by a number of mobile units (or users). The output signal is coherently shifted down from radio frequency and split into an in-phase (I) channel and a quadrature (Q) channel.

The I and Q channels of the output signal are filtered by the filters, $H^*(f)$, designated as 58 and 60, to form the filtered signals 62 and 66. Filtered signal 62 corresponds to the I channel of the output signal while filtered signal 66 corresponds to the Q channel. The filters 58 and 60 are counterparts to the filter $H(f)$ applied at the mobile unit to contain the transmitted signal within the specified bandwidth.

Figure 2:
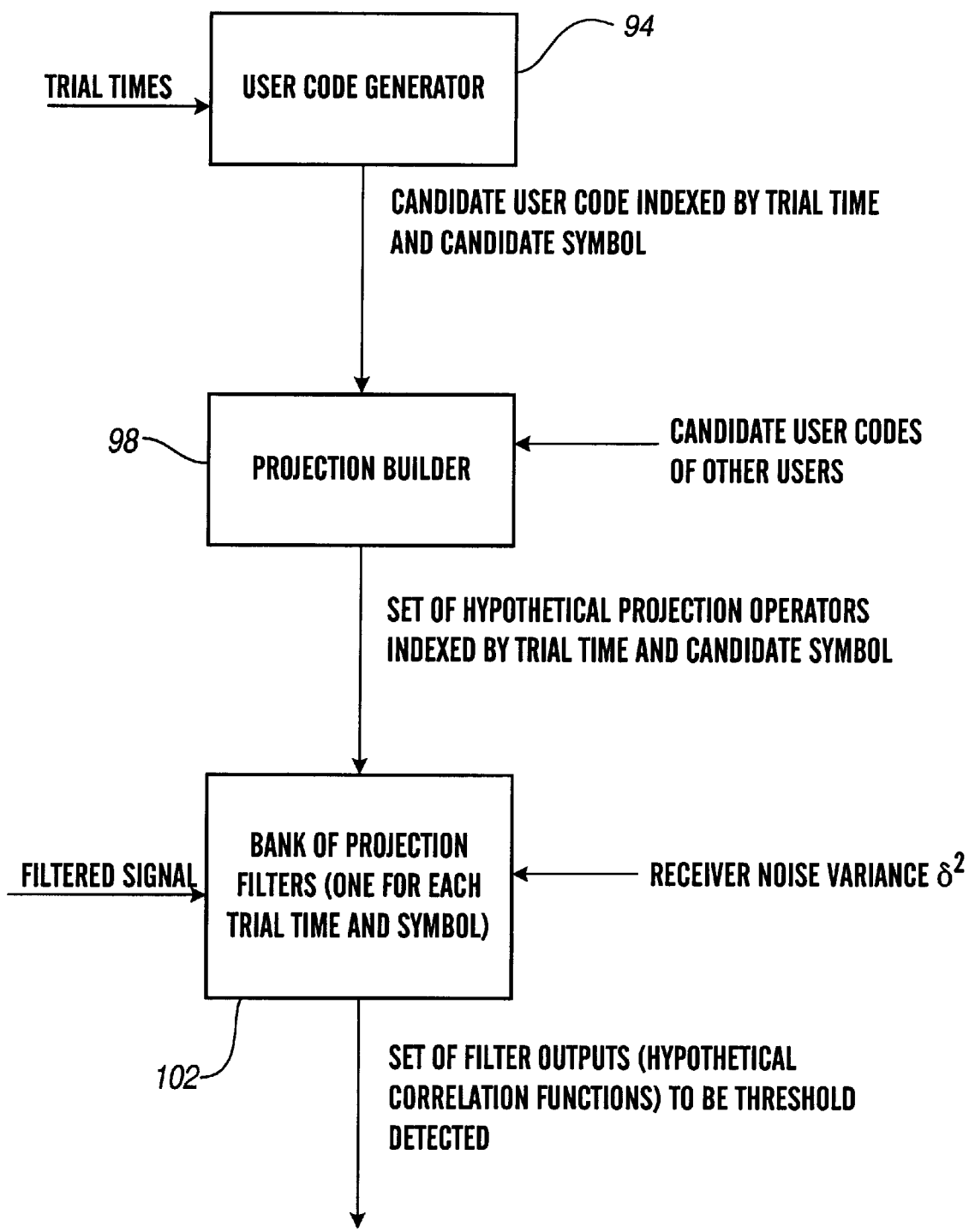
FIG. 2 depicts the various components of the correlating device.
Figure 3:
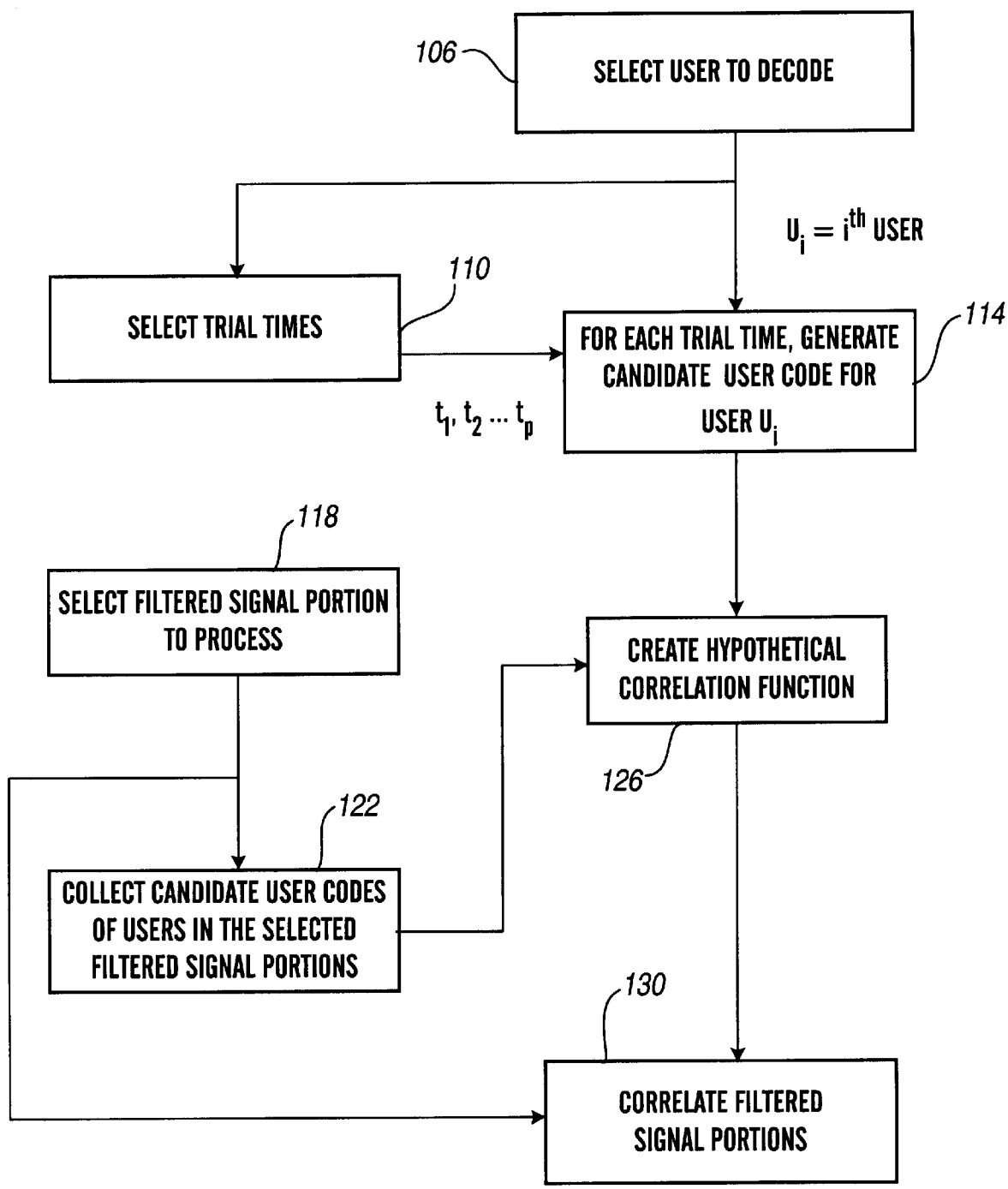
FIG. 3 depicts the unit steps performed by the components of FIG. 2.

Referring to FIGS. 1–3, the correlating device 70 includes a user code generator 94, a projection builder 98, and a bank of projection filters 102. For each of the filtered signals 62 and 66, the user code generator 94 selects 106 a user (i.e., the selected user) transmitting a selected signal segment in a selected portion of the filtered signal to be decoded, selects 110, for the selected user and signal segment, a set of trial transmit times ("trial times") and candidate symbols and, for each trial time and candidate symbol in the set, generates 114 a candidate user code (or interface code) for the selected user and signal segment. In selecting trial times, the base-station is assumed to have approximate synchronization with each of the mobile units. Using this approximate synchronization, the base station has a set of trial times at which each selected mobile unit may have transmitted the selected signal segment included in the filtered signals 62 and 66. For each trial time, $t_p$, in the set of trial times for the selected user and signal segment, the user code generator 94 generates one or more candidate user codes indexed by trial time and candidate symbol. The set of trial times used by the user code generator for determining the set of candidate user codes for a given signal segment is determined by known techniques. Typically, the user code generator will use a time interval centered on the receive time for the signal segment that has a width of about 200 milliseconds or less and more typically of about 50 milliseconds or less. These steps are repeated for each of the active users transmitting signal segment(s) of the filtered signal.

The projection builder 98 selects 118 a portion of the filtered signal to process, collects 122 appropriate candidate user codes for the users transmitting signal segments of the selected filtered signal portion from the output of the user code generator, and, using the receive time offsets, trial times, and candidate symbols, creates 126 a set of hypothetical projection operators.

The hypothetical projection operators are generated using the algorithm:

$$(I-S(S^TS)^{-1}S^T)H(H^T(I-S(S^TS)^{-1}S^T)H)^{-1}H^T(I-S(S^TS)^{-1}S^T)$$

where H corresponds to an interference code matrix for the selected signal segment, S corresponds to the interference code matrices for all of the other signal segments in the selected filtered signal portion, I is the identity matrix, and $^T$ corresponds to the transpose operation. The variables H and S depend upon the interference codes determined by the user code generator 94. Accordingly, H and S depend, respectively, upon the transmit time for the selected signal segment, and the transmit times of all of the other signal segments in the selected filtered signal portion. Because the data is indexed by the receive time, S is also a function of the receive time:

$$(I-S(S^TS)^{-1}S^T)H(H^T(I-S(S^TS)^{-1}S^T)H)^{-1}H^T(I-S(S^TS)^{-1}S^T).$$

To apply the above-equation, the projection builder 98 estimates the transmit times and symbols of each of the signal segments in the selected filtered signal portion. As noted, the trial time is an estimate of the transmit time and the candidate symbol of the symbol.

Next, the bank of projection filters 102, with one filter corresponding to each trial time and candidate symbol (i.e., to each hypothetical projection operator), provide a set of filter outputs (i.e., hypothetical correlation functions) to be threshold detected by the first threshold detecting device 74. Each of the bank of projection filters correlates 130 a plurality of multipath signal segments for a given trial time and candidate symbol. The projection filters 102 extract an estimated signal segment attributable to a given user from each selected filtered signal portion while simultaneously nulling out the other signal segments from other-users.

The equation used to generate the various hypothetical correlation functions is:

$$(y^T) \text{ (projection operator for selected signal portion)} (y)/\sigma^2$$

where y corresponds to the selected filtered signal portion 62 or 66 and $\sigma^2$ corresponds to the variance of the magnitude of the noise portion contained in the respective filtered signal portion. The equation is based on oblique or non-orthogonal projections of y onto space spanned by H to null interference (i.e., interference from signal segments transmitted by other users) and yield the signal segment transmitted by the selected user. Because the receive times for the various signal segments of a selected user are unknown, a number of signal segments of the user, each at a different receive-time offset, must be correlated by the bank of projection filters.

Figure 4:
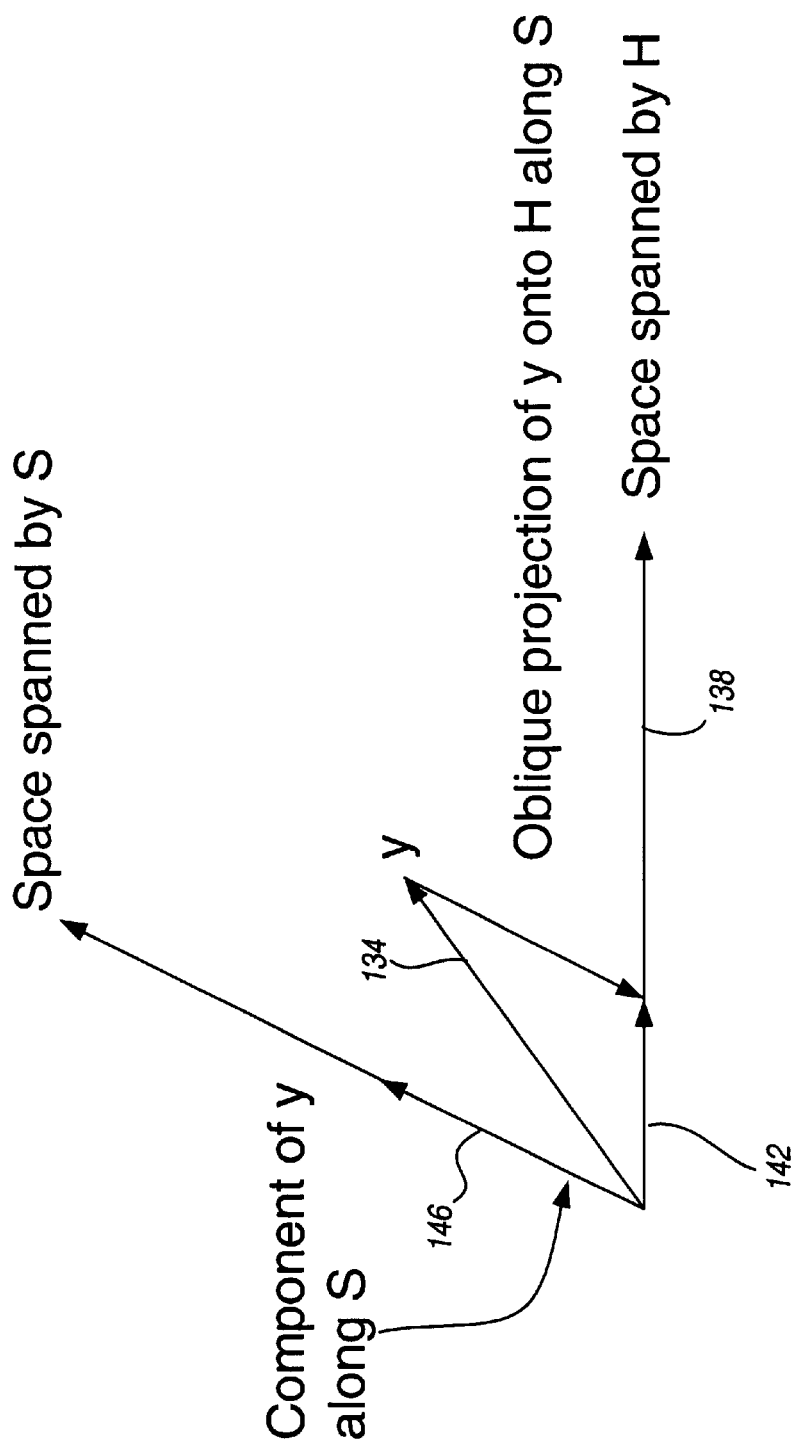
FIG. 4 depicts graphically the oblique projecting operation.

The oblique projection of y space 134 spanned by y onto H space 138 spanned by H to yield an estimate of the signal segment 142 is illustrated in FIG. 4. Y space 134 spanned by Y is obliquely projected onto the H space 138 along S space 146 spanned by S. Oblique projections are more effective than orthogonal projections in removing interference attributable to the other users where the Walsh codes are not synchronized and thus not orthogonal, such as in the reverse link of a CDMA system. In such cases, the correlation function is independent of the amplitudes of the signal segments of other users and, therefore, power control of the transmitter is not a significant consideration.

Figure 5:
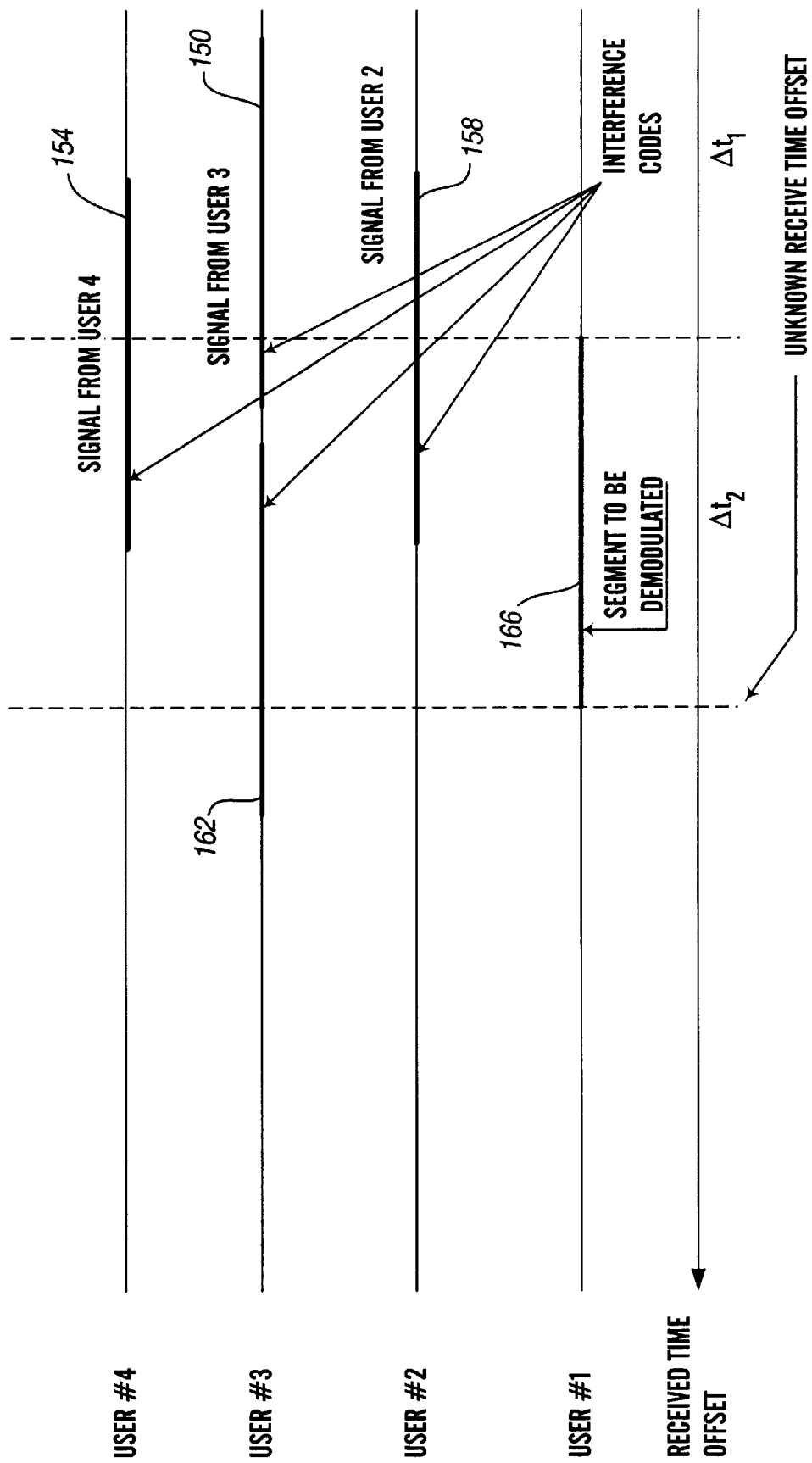
FIG. 5 depicts the signal segments contained in a portion of the filtered signal.

By way of illustration, FIG. 5 illustrates a four (4) user system in which the various users are transmitting symbols representing bits of data. The source signals are received by the antenna 50 as a number of multipath signal segments. A first multipath signal segment 150 is transmitted by a first user, a second multipath signal segment 154 by a second user, a third multipath signal segment 158 by a third user, a fourth multipath signal segment 162 by the first user, and a fifth multipath signal segment 166 from a fourth user. The projection builder 98 selects a first receive time offset $\Delta t_1$ and thereby selects the first, second and third multipath signal segments 150, 154 and 158. The width of the receive time offset is determined by the control system for the base station using known techniques. For the first multipath signal segment 150, the projection builder 98 employs $\Delta t_1$ and a trial time and candidate symbol in the projection operator equation and generates a hypothetical projection operator for the first user indexed by the trial time and candidate symbol. For the second multipath signal segment 154, the projection builder employs $\Delta t_1$, and a trial time and candidate symbol in the projection operator equation and generates a hypothetical projection operator for second user indexed by the trial time and candidate symbol. This operation is also performed for the third multipath signal segment 158 with a hypothetical projection operator for the third user being likewise generated. For the second receive time offset, $\Delta t_2$, the projection builder repeats the above steps for each of the fourth and fifth multipath signal segments 162 and 166 to generate additional projection operators for the first and fourth users. Although the first and fourth miltipath signals are multipaths of a common source signal, the hypothetical projection operators for the first and fourth multipath signal segments are different due to differing degrees of interference. These steps are repeated for subsequent receive time offsets. The number of receive time offsets generated is determined by the base station control system using known techniques. The bank of projection filters 102 then apply each of the hypothetical projection operators to the filtered signal portion corresponding to the respective receive time offset to develop a plurality of hypothetical correlation functions for the various users. Each of the hypothetical correlation functions defines a correlation surface 170 of the type depicted in FIG. 6, where the horizontal axes represent receive time and trial time and the vertical axis represents the output of the correlation function for a specific pair of receive times and trial times. One correlation function corresponds to a source signal transmitted by the selected user. Each peak 174*a–d* represents a multipath signal segment of the source signal.

Figure 6:
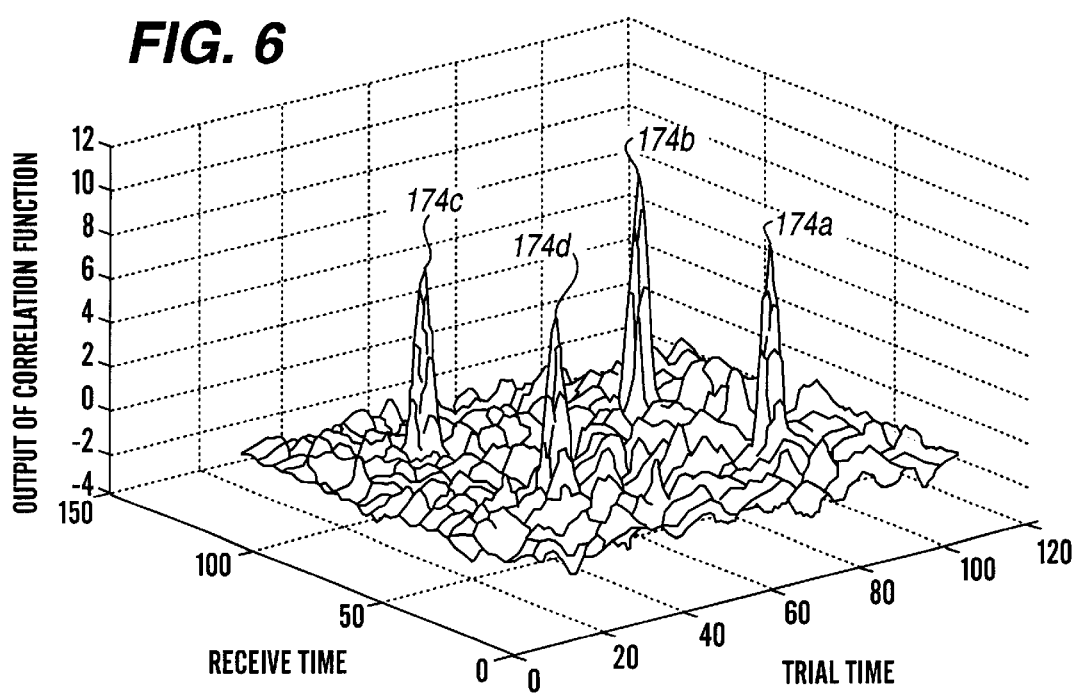
FIG. 6 depicts the three dimensional correlation surface output by the bank of projection filters in the correlating device in FIG. 1.

The first threshold detecting device 74 uses the hypothetical correlation functions for each user that are outputted by the bank of projection filters 102 to determine the temporal locations of the various multipath signal segments in the hypothetical correlation function. Due to multipath delays, each hypothetical correlation function can have multiple peaks as shown in FIG. 6. As set forth above, the various peaks in the correlation surface can be isolated using known mathematical techniques. Using techniques known in the art and the temporal location of the peaks (or timing information) output by the first threshold detecting device 74, the timing reconciliation device 78 determines a reference time for the RAKE processor 82. The reference time is based upon the receive times of the various peaks located by the first threshold detecting device 74. The reference time is used by the RAKE processor 82 as the time to which all of the signal segments for a given user are aligned.

The RAKE processor 82 based on the timing information, the peak amplitudes of the hypothetical correlation function (s) detected by the first threshold detecting device, and the filtered signals 62 and 66 scales and aligns (in time and phase) the various multipath signal segments. transmitted by a given user and then sums the aligned signal segments for that user. The RAKE processor 82 can be a maximal SNR combiner.

Figure 7:
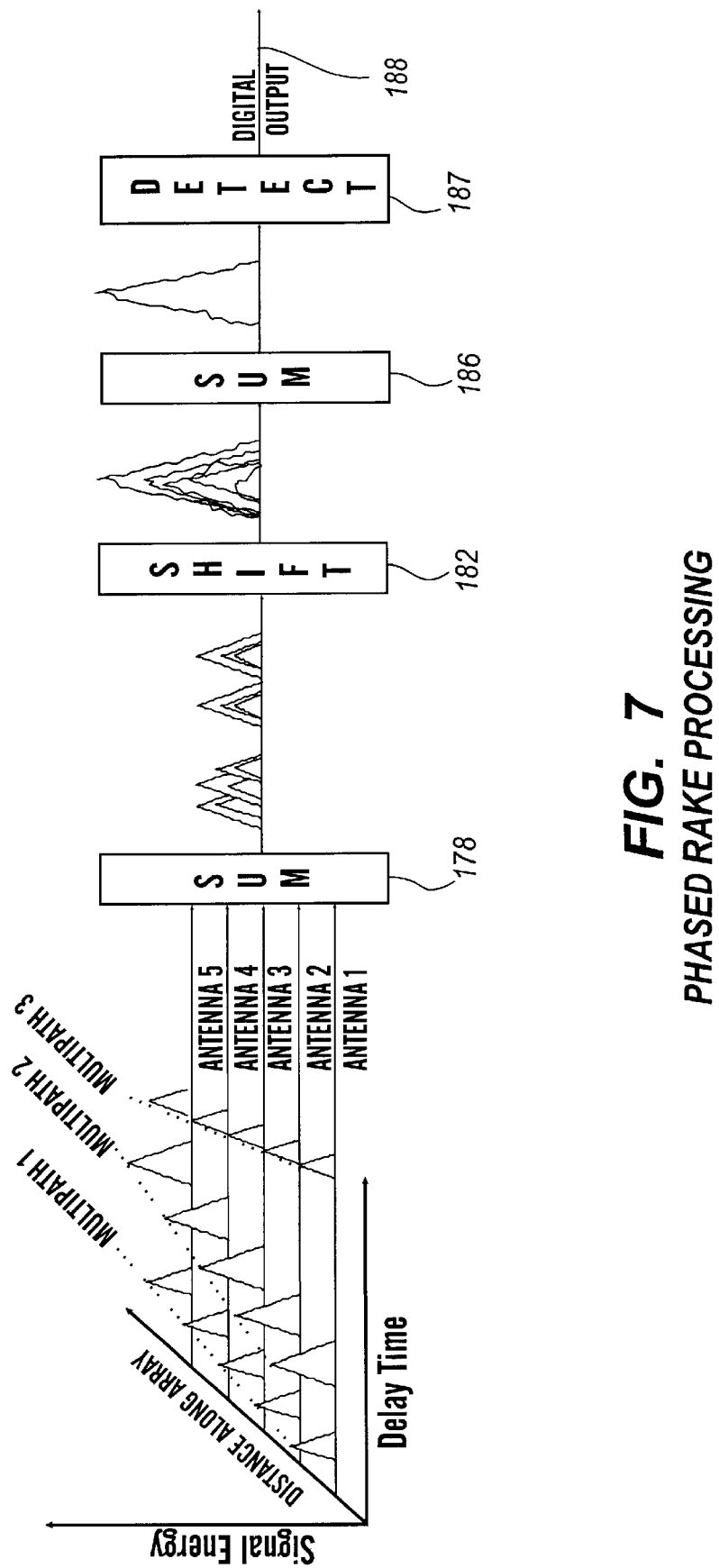
FIG. 7 pictorially depicts the operation of the RAKE processor.

The operation of the RAKE processor is illustrated in FIG. 7 (for an antenna array). As noted, the output of the bank of projection filters is the hypothetical correlation function, which in multipath environments typically has multiple peaks. Assuming that there are p multipaths or signal segments and therefore p peaks, the RAKE process determines the amplitudes, $\{A_i\}^P_{i=1}$, time delays, $\{t\}^P_{i,i=1}$, and phase delays $\{\phi_i\}^P_{i=1}$. If y(k) is a sequence defining the filtered signal 62 or 66, then the "RAKED" sequence is $y_R(K)$ $$y_R(K) = \frac{1}{\sum_{i=1}^p A_i} \sum_{i=1}^P A_i e^{-j\phi_i} y(k+t_i)$$

Referring again to FIGS. 1 and 7 (which illustrates the operation of RAKE processor 82), the RAKE processor 82 first sums 178 the outputs of the various antenna elements, shifts 182 the various sequences in the outputs by the amounts of the multipath delays between the corresponding multipath signal segments of a selected signal segment, so that all multipath signal segments are perfectly aligned. It then weights each shifted multipath signal segment by the amplitude of the correlation function corresponding to that segment and sums 186 the weighted components to produce the aligned signal $y_R(k)$. The aligned signal $y_R(k)$ is then detected 187 to form digital output 188.

Figure 8:
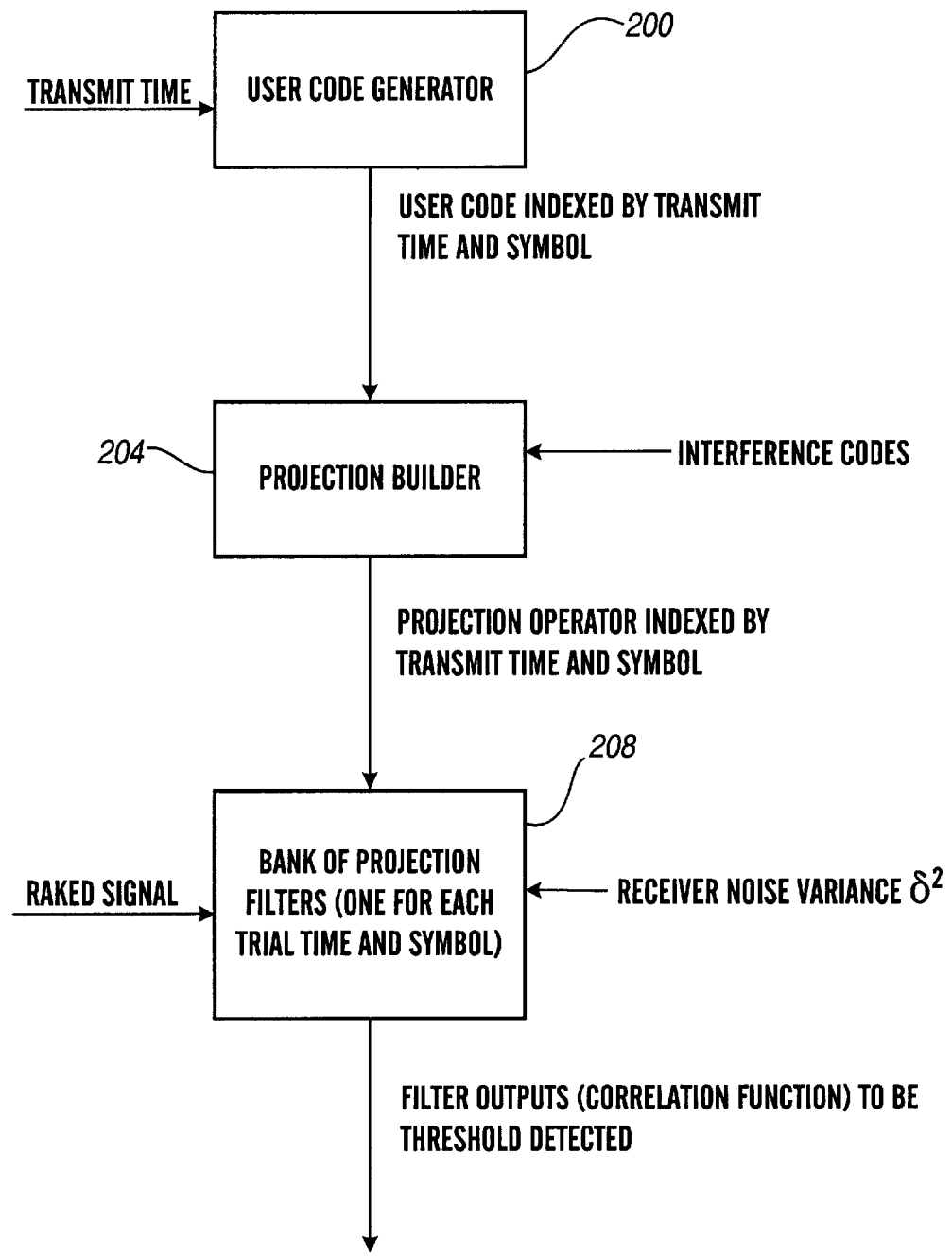
FIG. 8 depicts the various components of the demodulating device.

The demodulating device 86 correlates the "RAKED" sequence, $y_R(k)$ with the appropriate replicated segment of the coded signal in the filter bank 102 to produce the correct correlation function for detection by a second threshold detecting device 90. Referring to FIGS. 1 and 8 (which illustrates the components of demodulating device 86), the demodulating device 86, like the correlating device 70 includes a user code generator 200, a projection builder 204, and a bank of projection filters 208. The projection builder 204 and bank of projection filters 208 use the equations set forth above to provide projection operators and correlation functions. Unlike the correlating device 70 which provides for a series of hypothetical projection operators and correlation functions based on the trial time, receive time, and candidate symbol for each multipath signal segment, the demodulating device 86 uses the "RAKED" sequence which has only a single aligned signal segment rather than a plurality of independent multipath signal segments. Accordingly, the demodulating device 86 is able to reliably estimate the actual transmit time for the source signal and therefore requires considerably less processing to determine a correlation function than the correlating device 70.

For each of the I and Q channels, the user code generator 200 in the demodulating device 86 selects the user to decode for each aligned signal segment, selects a transmit time and symbol for the aligned signal segment and, for each transmit time and symbol, generates the user or interference code for the selected user The projection builder 204 selects a portion of the "RAKED" sequence to process, collects the pertinent user codes from the user code generator 200, and, using the receive times, transmit times, and symbols, creates a series of projection operators for each aligned signal segment in the "RAKED" sequence.

Next, the bank of projection filters 208, with one filter corresponding to each pair of transmit times and symbols and therefore each projection operator, provides a set of filter outputs (e.g., correlation functions) each defining a second correlation surface to be threshold detected.

Figure 9:
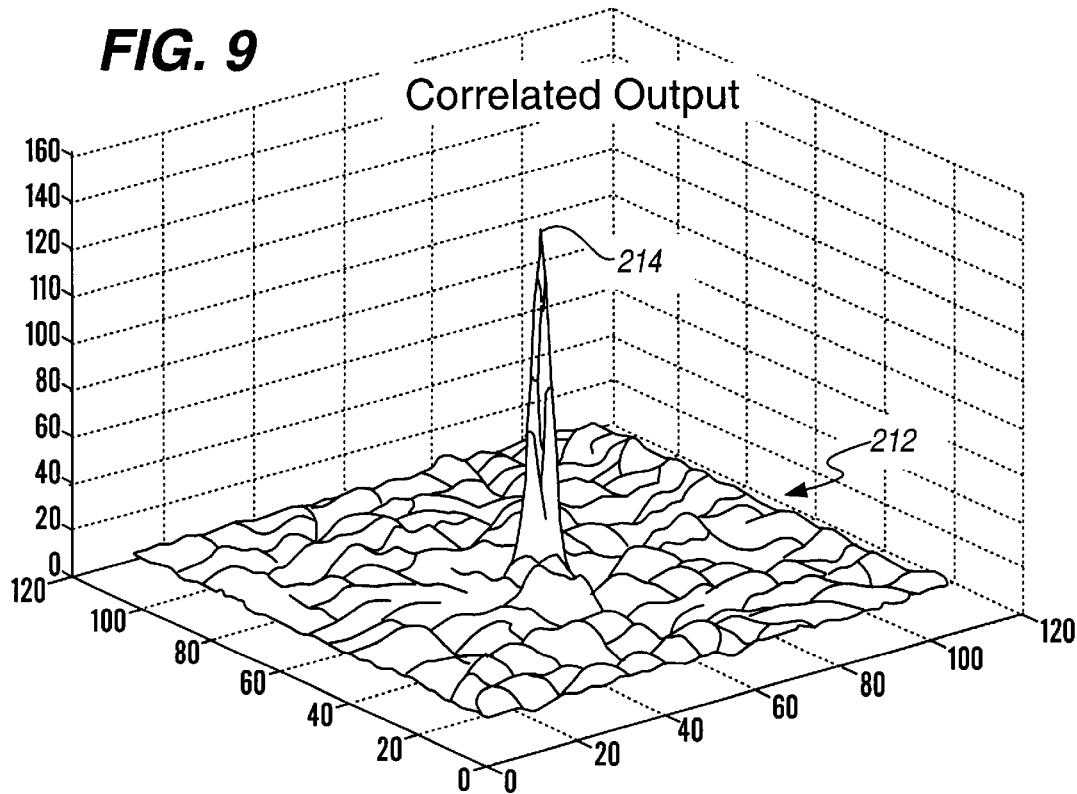
FIG. 9 depicts a correlation surface defined by the correlation function output by the output by the bank of projection filters in the demodulating device of FIG. 1.

The second correlation surface is then detected by a second threshold detecting device 90 to determine the actual transmit time and symbol for each aligned signal. FIG. 9 depicts a representative correlation surface 212 corresponding to a correlation function determined by one projection filter. Compared to the correlation surface 170 of FIG. 6, the correlation surface 212 has only a single peak 214 (due to the alignment of the multipath signal segments in the "RAKED" sequence) as opposed to multiple peaks.

Using the transmit time and symbol, the aligned signal segment can be despread to provide the digital data for the aligned signal segment transmitted by each user.

Because the above-described system assumes that the interference from other users is substantially the same for all multipath signal segments and/or that the amount of the interference in each multipath signal segment is relatively small, the RAKE processor 82 and demodulating device 86 require reconfiguration in applications where the interference in each of the multipath signal segments is substantially different and the interference is significant. To accommodate the differing interference portions in each multipath signal segment, the user code generator 200, projection builder 204, and bank of projection filters 208 process each multipath signal segment, corresponding to a peak in the correlation surface, before the RAKE processor has aligned, scaled, and summed each of the multipath signal segments. After the interference portion of each multipath signal segment is removed by oblique projection techniques from that signal segment, the various multipath signal segments can be aligned, scaled, and summed by the RAKE processor as set forth above. Alignment and scaling can be performed after oblique projection is completed as to a given multipath signal segment or after all oblique projection is completed for all multipath signal segments.

Multiple Antenna Systems

Figure 10:
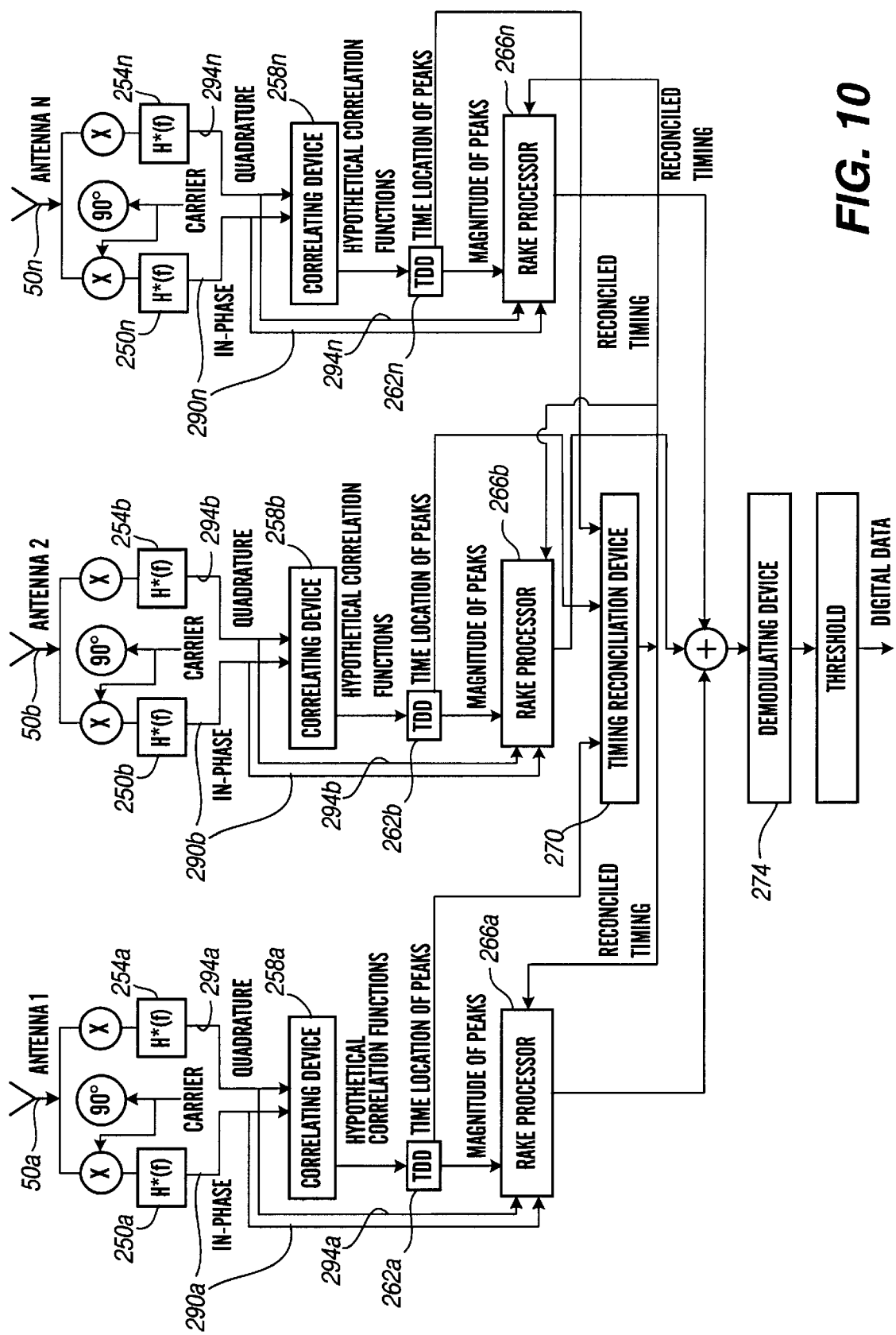
FIG. 10 is a second embodiment of the present invention for an antenna, array.

FIG. 10 depicts a multiple antenna system according to another embodiment of the present invention. Each antenna 50a–n is connected to filters 250a–n and 254a–n, correlating device 258a–n, threshold detecting device 262a–n, and a RAKE processor 266a–n. The threshold detecting devices 262a–n for all of the antennas 50a–n are connected to a common timing reconciliation device 270, which in turn is connected to all of the RAKE processors 266a–n. In this manner, all of the RAKE processing for all of the filtered signals is performed relative to a common reference time. The output of the RAKE processors 266a–n is provided to a common demodulating device 274 for determination of the correlation functions and summing of the signal portions received by all of the antennas that are attributable to a selected user. The system in effect "phases" the output of each antenna in order to maximize the SNR.

As will be appreciated, the output of each antenna in a conventional antenna array contains a desired signal but at a delay relative to the outputs of the other antennas. The amount of relative delay is a function of the arrangement of the antennas as well as the angular location of the source. Conventional beam-steering methods attempt to compensate for this time delay so that the desired signals add constructively thereby increasing the power of the desired signal. In general, an N antenna system can improve the SNR by a factor of N.

In the multiple antenna system of the present invention, by contrast, the compensation for the relative delays is performed in the RAKE processors 266a–n. In order to accomplish this, the system sums the antenna outputs without compensating for the relative delays. The correlation process may result in Np peaks as opposed to just p multipath induced peaks. These Np peaks are then used to align and scale the various signal segments prior to summation. The RAKE processor, in effect, performs the phase-delay compensation usually done in beam-steering.

The system architecture of the present invention thus does not require knowledge of array geometries and steering vectors. It does not require iterative searches for directions as is the case for systems that steer the beam using techniques like LMS and its variants. Finally, it is computationally very efficient.

Figure 11:
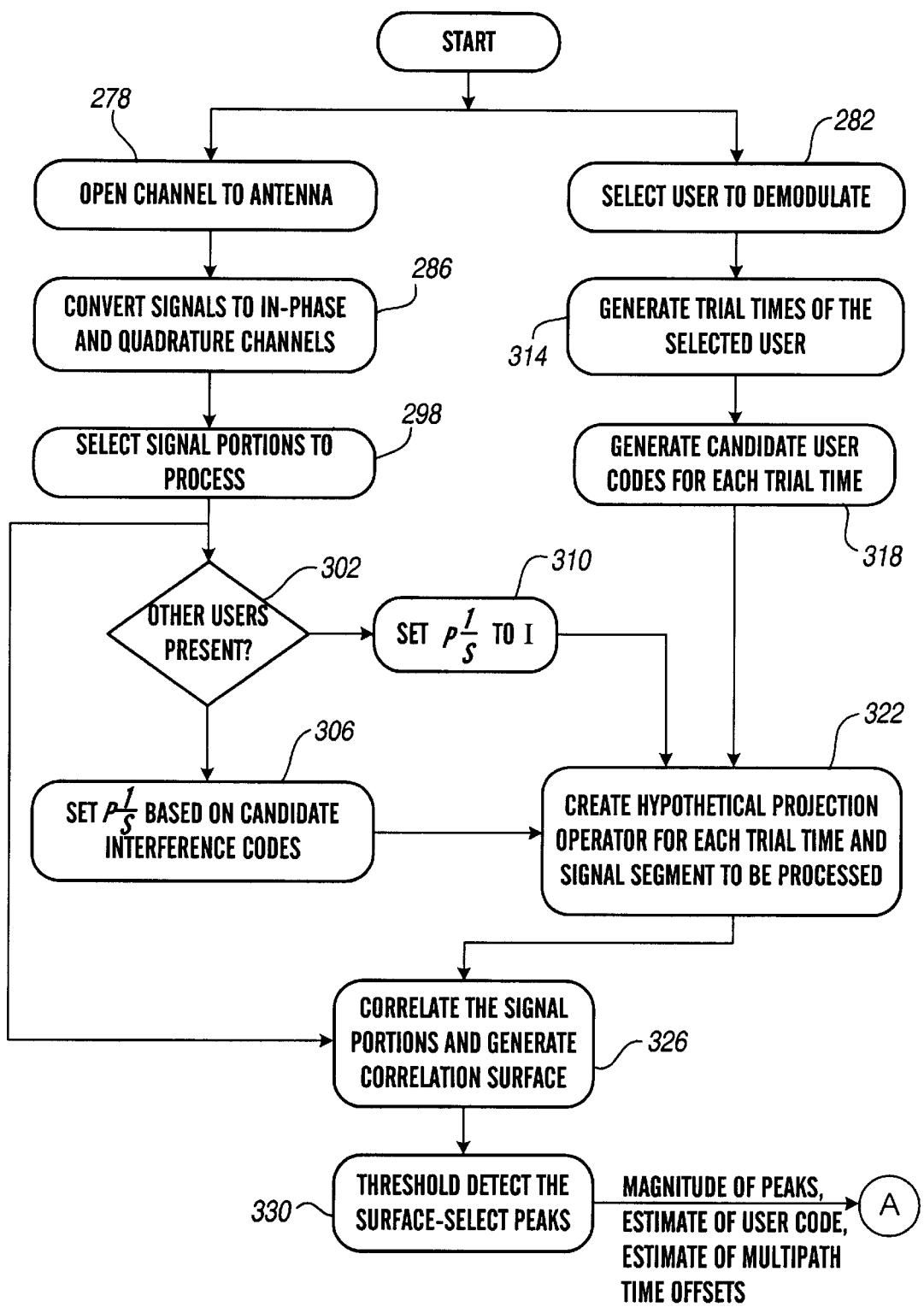
FIG. 11 is the first part of a flow schematic of the software for operating the system of FIG. 10.
Figure 12:
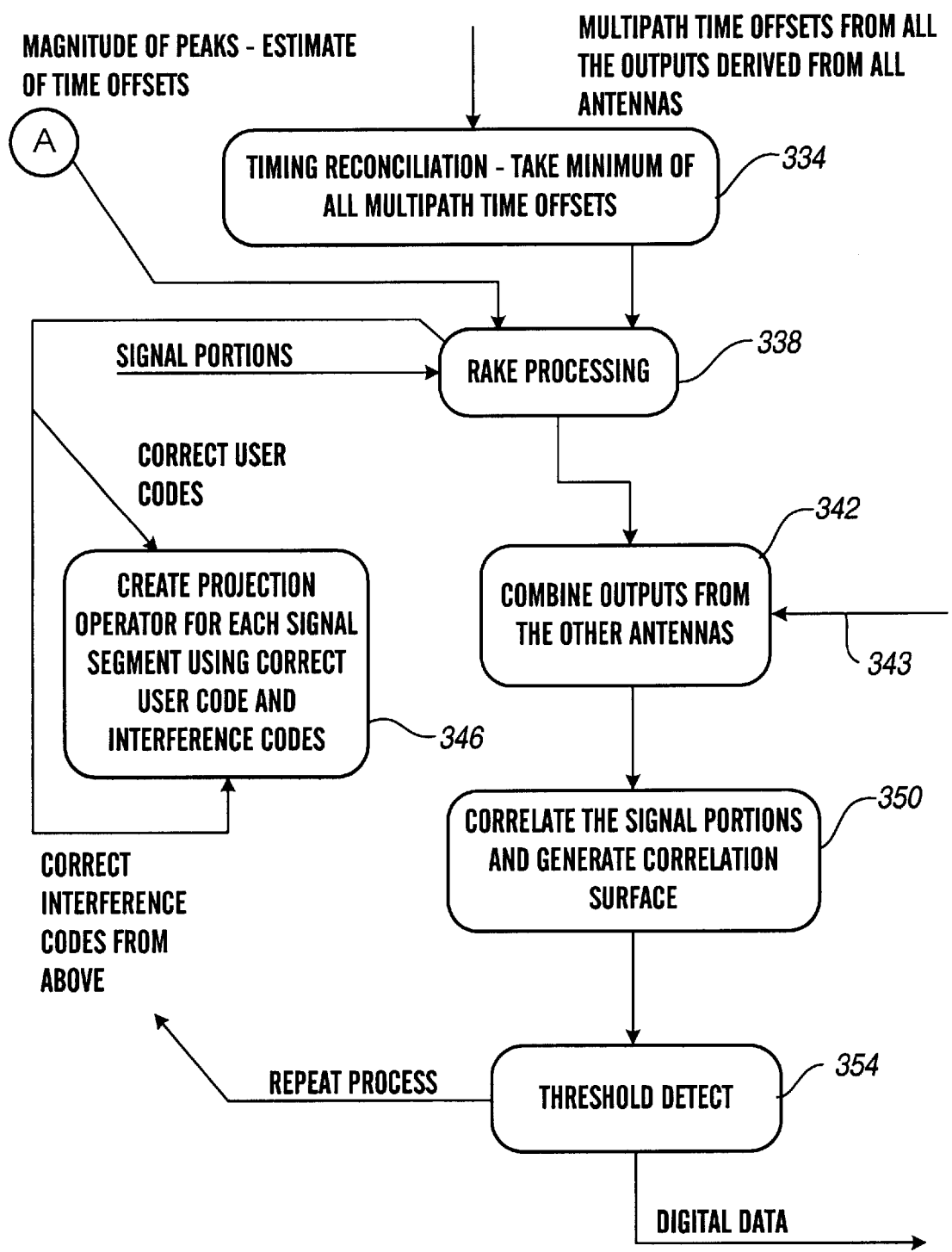
FIG. 12 is the second part of the flow schematic.

Referring to FIGS. 11–12, the software to operate the multiple antenna system of FIG. 10 will now be described. The software detects spread spectrum signals in the presence of interference from other users.

Initially, a channel is opened 278 to the respective antenna 50a–n, and a user is selected 282 to demodulate the signal segments transmitted by the selected user. The outputted spread spectrum signal of the respective antenna 50a–n is converted 286 into the I and Q channels. The channels are filtered by the filters 250a–n and 254a–n to form the filtered signals 290a–n and 294a–n. As will be appreciated, the filtering operation is generally not performed in radar and GPS applications.

Filtered signal portions are selected 298 for processing. In the query box 302, if other users are present in the selected filtered signal portion, $P^{\perp}_s$ is set 306 based on candidate interference codes. If not, $P^{\perp}_s$ is set 310 to I.

After the user is selected in box 282, trial times are generated 314 for the selected user. Next, candidate user codes are generated 318 for each of the trial times.

Next, hypothetical projection operators are created 322 for each trial time and filtered signal portion to be processed. The filtered signal portion is correlated 326 by user with the trial time, receive time, and candidate symbol to create the hypothetical correlation function. The hypothetical correlation function characterizes the multipath signal segments from the user of interest while nulling out the interference from other known users.

A correlation surface is generated and thresholded 330 to identify peaks in the hypothetical correlation functions.

Based on the receive times for all multipath signal segments for a given source signal received by each of the antennas, timing reconciliation 334 is performed. The minimum receive time of all of the corresponding multipath signal segments is selected as the reference time.

Based on the magnitudes of the peaks and the estimated receive times and the reference time, RAKE processing 338 is performed on all of the data segments.

The outputs from all of the RAKE processors 266a–n are combined 342 to form a combined output 343.

Using the correct user codes and the correct interference codes, which are provided by RAKE processing, projection operators are created 346 for each data segment.

Based on the projection operators and the combined output, the aligned multipath signals segments for all of the antennas are correlated 350 and a second correlation surface generated.

Threshold detection 354 is performed to provide the digital data. The above-noted steps are repeated for other users and/or other multipath signal segments.

Location Using Multiple Antenna System

The multiple antenna system of FIG. 10 can be utilized to locate the source of a selected signal by triangulation. In case the multiple antennas on a base-station are evenly spaced, with spacing d, then the time difference between when the first signal from the source impinges on any two antennas can be used to estimate direction of arrival of the signal. This approach assumes that the first signal is a direct signal from the source. If θ is the angle to the source and $t_0$ is the time delay from when the first signal hits the first antenna and then the second antenna, then the formula for computing θ is $$\theta = \sin^{-1}\left(\frac{ct_0}{d}\right)$$

where
    d-antenna spacing
    c-speed of light

Using ranging protocols currently in base-stations, one can obtain estimates of range to the source. This range information either alone or in combination with angle estimates, when obtained from multiple base-stations, can be processed using decentralized filtering algorithms to get accurate location information about the source. The decentralized filtering algorithms are known. Examples of decentralized filtering algorithms include decentralized Kalman filters and the Federated filter.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A system for receiving a signal, comprising:
    an antenna adapted to receive a signal, the signal being decomposable into a first CDMA signal segment attributable to a first emitter; and
    oblique projecting means for determining the first CDMA signal segment, the first CDMA signal segment spanning a first signal space, the oblique projecting means being in communication with the antenna and determining the first CDMA signal segment by projecting obliquely a signal space spanned by the signal onto the first signal space.

2. The system of claim 1, wherein the signal is also decomposable into a second signal segment attributable to an emitter other than the first emitter and wherein the signal space is obliquely projected onto the first signal space along a projection space that is parallel to a second signal space spanned by the second signal segment.

3. The system of claim 1, wherein the system includes:
    a) a plurality of antennas, each of which receives at least a portion of the signal, and
    b) a corresponding plurality of oblique projecting means in communication with the plurality of antennas, each of the plurality of oblique projecting means being adapted to determine by oblique projection the first CDMA signal segment of the respective signal portion received by the corresponding antenna.

4. The system of claim 3, including a corresponding plurality of RAKE processors in communication with the plurality of oblique projecting means, wherein each of the plurality of oblique projecting means produces a respective oblique projecting means output which is received as a RAKE processor input by each of the plurality of oblique projecting means' corresponding RAKE processor, the respective output of each of the plurality of oblique projecting means being delayed relative to one another, each of the plurality of RAKE processors being adapted to align and scale its respective input to produce a compensated output.

5. The system of claim 4, wherein the compensated output of each of the plurality of RAKE processors is delivered to a summing correlator.

6. The system of claim 3, further comprising:
   a plurality of RAKE processing means, each RAKE processing means being in communication with a corresponding one of the plurality of oblique projecting means and producing a corresponding aligned first signal attributable to the first emitter; and
   a demodulating means, in communication with the plurality of RAKE processing means, for demodulating at least a portion of each corresponding aligned first signal, the at least a portion of each corresponding aligned first signal defining a respective aligned first space, the demodulating means determining the corresponding aligned first signals by obliquely projecting a respective signal space defined by a corresponding aligned first signal onto the respective aligned first space.

7. The system of claim 1, further including a RAKE processor having a RAKE input, wherein the oblique projecting means produces an oblique projecting means output which is coupled to the RAKE input.

8. The system of claim 1, wherein the first CDMA signal segment comprises a plurality of multipath signal segments and the oblique projecting means outputs a correlation function having a plurality of peaks corresponding to the plurality of multipath signal segments, and further comprising:
   threshold detecting means, in communication with the, oblique projecting means, for generating timing information defining a temporal relationship among the plurality of peaks.

9. The system of claim 8, wherein the system comprises a plurality of oblique projecting means and a plurality of antennas and wherein each of said antennas is in communication with a corresponding threshold detecting means and further comprising:
   timing reconciliation means for determining a reference time based on timing information received from each of the threshold detecting means.

10. The system of claim 9, further comprising:
    a respective RAKE processing means, in communication with each of the oblique projecting means and the timing reconciliation means, for aligning the plurality of multipath signal segments in at least one of time and phase as a function of at least one of magnitudes of the plurality of multipath signal segments, the reference time, and the phase, wherein the RAKE means outputs an aligned first signal.

11. A system for receiving a signal, comprising:
    an antenna adapted to receive a signal and adapted to generate an output signal, the output signal being decomposable into:
    (i) a first CDMA signal portion attributable to a first source, and
    (ii) a noise portion, the noise portion having a magnitude; and,
    an oblique projection operator in communication with the antenna for determining the first CDMA signal portion of the output signal, the oblique projection operator determining the first CDMA signal portion of the output signal using an equation that comprises the following mathematical expression:

$$(I-S(S^TS)^{-1}S^T)H(H^T(I-S(S^TS)^{-1}S^T)H)^{-1}H^T(I-S(S^TS)^{-1}S^T)$$

wherein H is related to an interference code matrix of the first source, S is related to an interference code matrix of a second source, $^T$ denotes the transpose operation, and I denotes the identity matrix.

12. The system of claim 11, wherein the antenna includes a receiver and at least a portion of the noise portion is generated by the receiver.

13. The system of claim 11, wherein the system comprises a plurality of oblique projection operators corresponding to a plurality of antennas, each of the plurality of oblique projection operators being adapted to determine a respective first CDMA signal portion in a corresponding signal received by each of the plurality of antennas using the equation of claim 11.

14. The system of claim 13, including a corresponding plurality of RAKE processors in communication with the plurality of oblique projection operators, wherein each of the plurality of oblique projection operators produces a corresponding oblique projection operator output which is received as a RAKE processor input by its corresponding RAKE processor, the corresponding oblique projection operator output of each of the plurality of oblique projection operators being delayed relative to one another, each of the plurality of RAKE processors being adapted to align and scale their respective inputs to produce a corresponding compensated output.

15. The system of claim 14, wherein the corresponding compensated output of each of the plurality of RAKE processors is delivered to a second oblique projection operator in communication therewith for determining a refined first CDMA signal portion in each of the compensated outputs using the equation of claim 11.

16. The system of claim 11, wherein the first CDMA signal portion comprises a plurality of multipath signal segments and the oblique projection operator outputs a correlation function having a plurality of peaks corresponding to the plurality of multipath signal segments, and further comprising:
    a threshold detector, in communication with the oblique projection operator, for generating timing information defining a temporal relationship among the plurality of peaks.

17. The system of claim 16, wherein the system comprises a plurality of antennas and a plurality of oblique projection operators in communication with a corresponding threshold detector and further comprising:
    a timing reconciliation device for determining a reference time based on timing information received from each of the threshold detectors.

18. The system of claim 17, further comprising:
    a corresponding plurality of RAKE processors, in communication with the plurality of oblique projection operators and the timing reconciliation device, for aligning the plurality of multipath signal segments in at least one of time and phase based on magnitudes of the plurality of multipath signal segments and the reference time to form an aligned first CDMA signal.

19. A method for processing a composite signal, the method comprising the steps of:
    (a) providing a composite signal that is decomposable into a first CDMA signal portion that is attributable to a first emitter; and (b) obliquely projecting a signal space corresponding to the composite signal onto a first signal space corresponding to the first CDMA signal portion to determine a parameter of the first CDMA signal portion.

20. The method of claim 19, wherein the composite signal is decomposable into a second signal portion attributable to a second emitter other than the first emitter and wherein, in the obliquely projecting step, the signal space is obliquely projected onto the first signal space along a projection space that is parallel to a second signal space corresponding to the second signal portion.

21. The method of claim 20, wherein the obliquely projecting step is performed according to the following mathematical expression:

$$(I-S(S^TS)^{-1}S^T)H(H^T(I-S(S^TS)^{-1}S^T)H)^{-1}H^T(I-S(S^TS)^{-1}S^T)$$

where H is related to an interference code matrix of the first emitter, S is related to an interference code matrix of the second emitter, $^T$ denotes the transpose operation, and I denotes the identity matrix.

22. The method of claim 19, wherein the composite signal includes a second CDMA signal portion attributable to a second emitter other than the first emitter and wherein the obliquely projecting step determines the magnitude of the first CDMA signal portion and wherein the first and second CDMA signal portions are transmitted asynchronously.

23. The method of claim 22, further comprising:
   determining an actual time of transmission of the first CDMA signal portion;
   determining an actual received time for the first CDMA signal portion; and
   repeating step (b) using the actual time of transmission of the first CDMA signal portion and the actual received time.

24. The method of claim 19, wherein the first CDMA signal portion comprises a plurality of multipath signal segments and further comprising:
   aligning at least one of a received time and phase of the multipath signal segments to produce an aligned first signal.

25. The method of claim 24, further comprising:
   scaling the multipath signal segments.

26. The method of claim 19, wherein the first CDMA signal portion comprises a plurality of multipath signal segments, each of the plurality of multipath signal segments being received at different times, and further comprising:
   assigning to a portion of each of the plurality of multipath signal segments a respective time of receipt.

27. The method of claim 26, further comprising:
   determining a reference time of receipt based on the respective times of receipt.

28. The method of claim 27, further comprising:
   first, summing the plurality of multipath signal segments without regard to the differing times of receipt to form a summated peak magnitude;
   second, aligning the plurality of multipath signal segments relative to the reference time of receipt to form a plurality of aligned signals;
   third, scaling each of the multipath signal segments to form a plurality of scaled signals; and
   fourth, summing at least one of the aligned signals and the scaled signals.

29. A method for decomposing a composite signal having a first CDMA signal segment attributable to a first emitter, comprising:

obliquely projecting a signal space spanned by the composite signal onto a first signal space spanned by the first CDMA signal segment to determine a parameter of the first CDMA signal segment; and
processing the parameter.

30. The method of claim 29, wherein the composite signal includes a second CDMA signal segment attributable to a second emitter other than the first emitter and wherein, in the obliquely projecting step, the signal space is obliquely projected onto the first signal space along a projection space that is parallel to a second signal space spanned by the second CDMA signal segment.

31. The method of claim 30, wherein the obliquely projecting step is performed according to the following mathematical expression:

$$(I-S(S^TS)^{-1}S^T)H(H^T(I-S(S^TS)^{-1}S^T)H)^{-1}H^T(I-S(S^TS)^{-1}S^T)$$

where H is related to an interference code matrix of the first emitter, S is related to an interference code matrix of the second emitter, $^T$ denotes the transpose operation, and I denotes the identity matrix.

32. The method of claim 29, wherein the composite signal includes a second CDMA signal segment attributable to a second emitter other than the first emitter and wherein the first and second CDMA signal segments are transmitted asynchronously.

33. The method of claim 29, wherein the first CDMA signal segment comprises a plurality of multipath signal segments and further comprising:
   aligning at least one of a received time and phase of the multipath signal segments to produce an aligned first signal.

34. The method of claim 33, further comprising:
   scaling the multipath signal segments.

35. The method of claim 29, wherein the first CDMA signal segment comprises a plurality of multipath signal segments, each of the plurality of multipath signal segments being received at different times, and further comprising:
   assigning to a portion of each of the plurality of multipath signal segments a respective time of receipt.

36. The method of claim 35, further comprising:
   determining a reference time of receipt based on the respective times of receipt.

37. The method of claim 36, further comprising:
   first, summing the plurality of multipath signal segments without regard to the differing times of receipt to form a summated peak magnitude;
   second, aligning the plurality of multipath signal segments relative to the reference time of receipt to form a plurality of aligned signals;
   third, scaling each of the multipath signal segments to form a plurality of scaled signals; and
   fourth, summing at least one of the aligned signals and the scaled signals.

38. The method of claim 29, further comprising:
   determining an actual time of transmission of the first CDMA signal segment;
   determining an actual received time for the first CDMA signal segment; and
   repeating the obliquely projecting step using the actual time of transmission of the first CDMA signal segment and the actual received time.

39. A system for processing an output signal of an antenna, comprising:

an oblique projection operator that determines a parameter of a selected signal component of an output signal of a receiving antenna, the selected signal component being attributable to an emitter having an interference code matrix and the oblique projection operator determining a parameter of the selected signal component by projecting obliquely an output signal space spanned by the output signal onto a selected signal space spanned by the selected signal component.

40. The system of claim 39, wherein the antenna includes a receiver and at least a portion of a noise portion of the output signal is generated by the receiver.

41. The system of claim 39, wherein the system comprises a plurality of oblique projection operators corresponding to a plurality of antennas and being in communication therewith, each of the plurality of oblique projection operators being adapted to determine a respective selected signal component of a corresponding portion of a respective composite signal received by each of the plurality of antennas and determine the respective selected signal component of the corresponding output signal using an equation that includes the following mathematical expression:

$$(I-S(S^TS)^{-1}S^T)H(H^T(I-S(S^TS)^{-1}S^T)H)^{-1}H^T(I-S(S^TS^{-1})S^T)$$

where H is related to the interference code matrix of the emitter, S is related to an interference code matrix of a second emitter, $^T$ denotes the transpose operation, and I denotes the identity matrix.

42. The system of claim 41, wherein the system comprises a plurality of RAKE processors corresponding to the plurality of oblique projection operators, wherein each of the plurality of oblique projection operators produces a corresponding oblique projection operator output which is received as a RAKE processor input by each of the plurality of oblique projection operator's corresponding RAKE processor, the corresponding oblique projection operator output of each of the plurality of oblique projection operators being delayed relative to one another, each of the plurality of RAKE processors being adapted to align and scale their respective inputs to produce a corresponding compensated output.

43. The system of claim 42, wherein the corresponding compensated output of each of the plurality of RAKE processors is delivered to a second oblique projection operator in communication therewith for determining a refined oblique projection operator output of each of the compensated outputs using the equation of claim 41.

44. The system of claim 39, wherein the selected signal component comprises a plurality of multipath signal segments and the oblique projection operator outputs a correlation function having a plurality of peaks corresponding to the plurality of multipath signal segments, and further comprising:

a threshold detector, in communication with the oblique projection operator, for generating timing information defining a temporal relationship among the plurality of peaks.

45. The system of claim 44, wherein the system comprises a plurality of antennas, each in communication with a corresponding threshold detector and further comprising:

a timing reconciliation device for determining a reference time based on timing information received from each of the threshold detectors.

46. The system of claim 45, further comprising:

a plurality of RAKE processors, in communication with a plurality of oblique projection operators and the timing reconciliation device, for aligning the plurality of multipath signal segments in at least one of time and phase based on magnitudes of the plurality of multipath signal segments and the reference time to form an aligned first signal.

47. A system for processing a plurality of output signals of a plurality of antennas, the output signals being decomposable into a respective portion of a first coded signal component attributable to a first source having an interference code matrix, comprising:

a plurality of oblique projection means, corresponding with the plurality of antennas and being in communication therewith, for obliquely projecting a respective signal space spanned by the respective output signal onto a respective first signal space spanned by the respective first coded signal component to determine a parameter of the first coded signal component.

48. The system of claim 47, wherein at least one of the output signals is decomposable into a second coded signal component, the second coded signal component being attributable to a second source other than the first source and wherein the respective signal space is obliquely projected onto the respective first signal space along a projection space that is parallel to a second signal space corresponding to the second coded signal component.

49. The system of claim 47, wherein the system comprises a plurality of RAKE processors corresponding with the plurality of oblique projection means, wherein each of the plurality of oblique projection means produces a respective oblique projection means output which is received as a RAKE processor input by each of the plurality of oblique projection means' corresponding RAKE processor, the respective output of each of the plurality of oblique projection means being delayed relative to one another, each of the plurality of RAKE processors being adapted to align and scale its respective input to produce a compensated output.

50. The system of claim 49, wherein the compensated output of each of the plurality of RAKE processors is delivered to a summing correlator.

51. The system of claim 47, wherein a first oblique projection comprises a plurality of multipath signal segments and at least one of the plurality of oblique projection means outputs a correlation function having a plurality of peaks corresponding to the plurality of multipath signal segments, and further comprising:

threshold detection means, in communication with the at least one oblique projection means, for generating timing information defining a temporal relationship among the plurality of peaks.

52. The system of claim 51, further comprising:

timing reconciliation means for determining a reference time based on timing information received from the threshold detection means.

53. The system of claim 52, further comprising:

a plurality of RAKE processing means, wherein a respective RAKE processing means is in communication with each of the plurality of oblique projecting means and the timing reconciliation means, for aligning the plurality of multipath signal segments in at least one of time and phase as a function of at least one of the magnitudes of the plurality of multipath signal segments, the reference time, and the phase, each RAKE processing means outputting a corresponding aligned first signal.

54. The system of claim 53, further comprising:

a demodulating means, in communication with the plurality of RAKE processing means, for demodulating at least a portion of each corresponding aligned first signal, the at least a portion of each corresponding aligned first signal defining a respective aligned first space, the demodulating means determining the corresponding aligned first signals by obliquely projecting a respective signal space defined by a corresponding aligned first signal onto the respective aligned first space.

55. A coded signal processor, comprising:

a plurality of oblique projection operators in communication with a corresponding plurality of antennas, each of the plurality of oblique projection operators projecting a corresponding composite signal space spanned by a respective composite coded signal output by the corresponding antenna onto a corresponding first signal space spanned by a respective first signal component of the respective composite coded signal along a corresponding projection space that is parallel to a corresponding second signal space spanned by at least a respective second signal component of the respective composite coded signal to determine a corresponding parameter of the respective first signal component, wherein the projection of the corresponding composite signal space onto the corresponding first signal space along the corresponding projection space is performed in accordance with the following mathematical expression:

$$(I-S(S^TS)^{-1}S^T)H(H^T(I-S(S^TS)^{-1}S^T)H)^{-1}H^T(I-S(S^TS^{-1})S^T$$

where H is related to an interference code matrix of a first emitter associated with the respective first signal component, S is related to an interference code matrix of a second emitter associated with the respective second signal component, $^T$ denotes the transpose operation, and I denotes the identity matrix.

56. The coded signal processor of claim 55, wherein the corresponding parameter is a time offset.

57. The coded signal processor of claim 55, wherein at least a portion of a noise portion of the respective composite coded signal is generated by a receiver.

58. The coded signal processor of claim 55, comprising a corresponding plurality of RAKE processors in communication with the plurality of oblique projection operators, wherein each of the plurality of oblique projection operators produces a corresponding oblique projection operator output which is received as a RAKE processor input by each oblique projection operator's corresponding RAKE processor, the corresponding oblique projection operator output of each of the plurality of oblique projection operators being delayed relative to one another, each of the plurality of RAKE processors being adapted to align and scale their respective inputs to produce a corresponding compensated output.

59. The coded signal processor of claim 58, wherein the corresponding compensated output of each of the plurality of RAKE processors is delivered to a second oblique projection operator in communication therewith for determining a refined oblique projection operator output corresponding to the compensated outputs using the equation of claim 55.

60. A method for processing a composite signal, comprising:

projecting a first composite signal space spanned by a first composite coded signal onto a first signal space spanned by a first signal component of the first composite coded signal along a projection space parallel to a first interference space spanned by a second signal component of the first composite coded signal to determine a parameter of the first signal component, wherein the first signal component is attributable to at least a first emitter and the second signal component is attributable to at least a second emitter other than the at least a first emitter.

61. The method of claim 60, wherein the method determines a parameter and the parameter is a time offset.

62. The method of claim 60, wherein the first and second signal components are transmitted asynchronously.

63. The method of claim 60, wherein the first signal component comprises a plurality of multipath signal segments and further comprising:

aligning at least one of a received time and phase of the multipath signal segments to produce an aligned first signal.

64. The method of claim 60, further comprising:

determining an actual time of transmission of the first signal component;

determining an actual received time for the first signal component; and repeating the projecting step using the actual time of transmission of the first signal component and the actual received time.

65. The method of claim 60, wherein the projecting step is performed according to an equation that includes the following mathematical expression:

$$(I-S(S^TS)^{-1}S^T)H(H^T(I-S(S^TS)^{-1}S^T)H)^{-1}H^T(I-S(S^TS)^{-1}S^T)$$

where H is related to an interference code matrix of the at least a first emitter, S is related to an interference code matrix of the at least a second emitter, $^T$ denotes the transpose operation, and I denotes the identity matrix.

66. A method for processing a composite signal, comprising:

projecting a first composite signal space spanned by a first composite coded signal onto a first signal space spanned by a first signal component of the first composite coded signal along a projection space parallel to a first interference space spanned by a second signal component of the first composite coded signal to determine a parameter of the first signal component, wherein the first sgianl component is atrtibuatable to at least a first emitter and the second signal component is attribuatable to at least a second emitter other than the at least a first emitter.

67. The method of claim 66, wherein the first signal component is attributable to a first emitter, and the coded signal includes at least a second signal component attributable to at least a second emitter different from the first emitter.

68. The method of claim 67, wherein at least a portion of the projecting step is performed according to the following mathematical expression:

$$(I-S(S^TS)^{-1}S^T)H(H^T(I-S(S^TS)^{-1}S^T)H)^{-1}H^T(I-S(S^TS)^{-1}S^T),$$

where H is related to an interference code matrix of the first emitter, S is related to an interference code matrix of the at least a second emitter, $^T$ denotes the transpose operation, and I denotes the identity matrix.

69. The method of claim 66, wherein the first signal component is attributable to a first emitter, the coded signal includes at least a second signal component attributable to at least a second emitter other than the first emitter and wherein the first and second signal components are transmitted asynchronously.

70. The method of claim 66, wherein the first signal component comprises a plurality of multipath signal segments and further comprising:

aligning at least one of a received time and phase of the multipath signal segments to produce an aligned first signal.

71. The method of claim 70, further comprising:

scaling the multipath signal segments.

72. The method of claim 66, wherein the first signal component comprises a plurality of multipath signal segments, each of the plurality of multipath signal segments being received at different times, and further comprising:

assigning to a portion of each of the plurality of multipath signal segments a respective time of receipt.

73. The method of claim 66, further comprising:

determining an actual time of transmission of the first signal component;

determining an actual received time for the first signal component; and repeating the projecting step using the actual time of transmission of the first signal component and the actual received time.

74. A system for receiving a signal, comprising:

an antenna adapted to receive a signal, the signal being decomposable into a first coded signal segment attributable to a first emitter;

oblique projecting means for determining the first coded signal segment, the first coded signal segment spanning a first signal space, the oblique projecting means being in communication with the antenna and determining the first coded signal segment by projecting obliquely a signal space spanned by the signal onto the first signal space; and a RAKE processor having a RAKE input, wherein the oblique projecting means produces an oblique projecting means output which is coupled to the RAKE input.

75. The system of claim 74, further comprising:

second oblique projecting means for determining, based on the output of the RAKE processor, a transmit time and symbol for a first coded signal corresponding to the first coded signal segment; and decoding means for decoding the first coded signal based on the transmit time and symbol.

76. A system for receiving a signal, comprising:

an antenna adapted to receive a signal, the signal being decomposable into a first coded signal segment attributable to a first emitter;

oblique projecting means for determining the first coded signal segment, the first coded signal segment spanning a first signal space, the oblique projecting means being in communication with the antenna and determining the first coded signal segment by projecting obliquely a signal space spanned by the signal onto the first signal space, wherein the first coded signal segment comprises a plurality of multipath signal segments and the oblique projecting means outputs a correlation function having a plurality of peaks corresponding to the plurality of multipath signal segments; and threshold detecting means, in communication with the oblique projecting means, for generating timing information defining a temporal relationship among the plurality of peaks.

77. A method for processing a composite signal, the method comprising the steps of:

(a) providing at least one composite signal that is decomposable into at least a first coded signal portion that is attributable to a first emitter;

(b) obliquely projecting at least one signal space corresponding to the at least one composite signal onto at least a first signal space corresponding to the at least a first coded signal portion to determine at least one parameter of the at least a first coded signal portion, wherein the at least a first coded signal portion comprises a plurality of multipath signal segments; and (c) aligning at least one of a received time and phase of the multipath signal segments to produce an aligned first signal.

78. The method of claim 77, further comprising:

(d) selecting a trial transmit time and candidate symbol for the aligned first signal;

(e) generating a candidate interference code corresponding to the aligned first signal;

(f) determining a projection operator corresponding to the aligned first signal;

(g) generating a correlation function corresponding to the aligned first signal;

(h) determining at least one of a transmit time and symbol for the aligned first signal; and (i) based on the at least one of a determined transmit time and the determined symbol, decoding the aligned first signal.

79. The method of claim 77, wherein step (b) comprises:

selecting a candidate symbol. and trial time corresponding to the first coded signal portion;

generating a candidate interference code corresponding to the first coded signal portion;

determining a hypothetical projection operator corresponding to the first coded signal portion;

generating a hypothetical correlation function corresponding to the first coded signal portion; and detecting a peak in the hypothetical correlation function to provide timing information used in the aligning step.

80. A method for processing a composite signal, the method comprising the steps of:

(a) providing at least one composite signal that is decomposable into at least a first coded signal portion that is attributable to a first emitter;

(b) obliquely projecting at least one signal space corresponding to the at least one composite signal onto at least a first signal space corresponding to the at least a first coded signal portion to determine at least one parameter of the at least a first coded signal portion, wherein the at least a first coded signal portion comprises a plurality of multipath signal segments, each of the plurality of multipath signal segments being received at different times; and (c) assigning to at least a portion of the plurality of multipath signal segments a respective time of receipt.

81. A method for decomposing a composite signal having a first coded signal segment attributable to a first emitter, comprising:

obliquely projecting a signal space spanned by the composite signal onto a first signal space spanned by the first coded signal segment to determine at least one parameter of the first coded signal segment;

processing the parameter, wherein the first coded signal segment comprises a plurality of multipath signal segments; and aligning at least one of a received time and phase of the multipath signal segments to produce an aligned first signal.

82. A method for decomposing a composite signal having a first coded signal segment attributable to a first emitter, comprising:
obliquely projecting a signal space spanned by the composite signal onto a first signal space spanned by the first coded signal segment to determine at least one parameter of the first coded signal segment;
processing the parameter;
determining a time of transmission of the first coded signal segment;
determining a received time for the first coded signal segment; and
repeating the obliquely projecting step using the time of transmission and the received time of the first coded signal segment.

83. A system for processing an output signal of an antenna, comprising:
an oblique projection operator that determines at least one parameter of a selected signal component of an output signal of an antenna, the selected signal component being attributable to an emitter having an interference code matrix and the oblique projection operator determining at least one parameter of the selected signal component by projecting obliquely an output signal space spanned by the output signal onto a selected signal space spanned by the selected signal component to form an oblique projection of the output signal space on the selected signal space, wherein the oblique projection comprises a plurality of multipath signal segments and the oblique projection operator outputs a correlation function having a plurality of peaks corresponding to the plurality of multipath signal segments; and
a threshold detector, in communication with the oblique projection operator, for generating timing information defining a temporal relationship among the plurality of peaks.

84. The system of claim 83, further composing:
a RAKE processor that uses the timing information to align and scale the selected signal component to provide a RAKE output;
a correlator that determines a correlation function based on the RAKE output;
a second threshold detector that determines, based on the correlation function, a transmit time and symbol for the RAKE output; and
a decoder that decodes a selected signal corresponding to the selected signal component using the transmit time and symbol.

85. A system for processing an output signal of an antenna, the output signal being decomposable into a first coded signal component attributable to a first source having an interference code matrix, comprising:
oblique projection means for obliquely projecting a signal space spanned by the output signal onto a first signal space spanned by the first coded signal component to determine at least one parameter of the first coded signal component; and
a RAKE processor having a RAKE input, wherein the oblique projection means produces an oblique projection means output which is coupled to the RAKE input.

86. The system of claim 85, wherein the oblique projecting means outputs a correlation function having a plurality of peaks and further comprising:

a first threshold detector that generates timing information defining a temporal relationship among the plurality of peaks, wherein the timing information is in the oblique projection means output;
a correlator that determines a correlation function based on the output of the RAKE processor;
a second treshold detector that determines, based on the correlation function, a transmit time and symbol for the RAKE output; and
a decoder that decodes a selected signal corresponding to the first coded signal component using the transmit time and symbol.

87. A method for processing a composite signal, the method comprising the steps of:
(a) providing a composite signal that is decomposable into a first coded signal portion that is attributable to a first emitter; and
(b) obliquely projecting a signal space corresponding to the composite signal onto a first signal space corresponding to the first coded signal portion to determine at least one parameter of the first coded signal portion, wherein the composite signal is decomposable into a second signal portion attributable to a second emitter other than the first emitter, wherein, in the obliquely projecting step, the signal space is obliquely projected onto the first signal space along a projection space that is parallel to a second signal space corresponding to the second signal portion, and wherein at least a portion of the obliquely projecting step is performed according to the following mathematical expression:

$$(I-S(S^TS)^{-1}S^T)H(H^T(I-S(S^TS)^{-1}S^T)H)^{-1}H^T(I-S(S^TS)^{-1}S^T),$$

where H is related to an interference code matrix of the first emitter, S is related to an interference code matrix of the second emitter, $^T$ denotes the transpose operation, and I denotes the identity matrix.

88. A method for decomposing a composite signal having a first coded signal segment attributable to a first emitter, comprising:
obliquely projecting a signal space spanned by the composite signal onto a first signal space spanned by the first coded signal segment to determine at least one parameter of the first coded signal segment; and
processing the parameter, wherein the composite signal includes a second coded signal segment attributable to a second emitter other than the first emitter, wherein, in the obliquely projecting step, the signal space is obliquely projected onto the first signal space along a projection space that is parallel to a second signal space spanned by the second coded signal segment, and wherein at least a portion of the obliquely projecting step is performed according to the following mathematical expression:

$$(I-S(S^TS)^{-1}S^T)H(H^T(I-S(S^TS)^{-1}S^T)H)^{-1}H^T(I-S(S^TS)^{-1}S^T)$$

where H is related to an interference code matrix of the first emitter, S is related to an interference code matrix of the second emitter, $^T$ denotes the transpose operation, and I denotes the identity matrix.

89. A coded signal processor, comprising:
at least a first oblique projection operator that projects at least one composite signal space spanned by a composite coded signal onto at least a first signal space spanned by at least a first signal component of the composite coded signal along at least one projection space that is parallel to at least a second signal space spanned by at least a second signal component of the composite coded signal to determine at least one parameter of the at least a first signal component, wherein the at least a first signal component comprises a plurality of multipath signal segments and the first oblique projection operator outputs a correlation function having a plurality of peaks corresponding to the plurality of multipath signal segments; and a threshold detector, in communication with the first oblique projection operator, for generating timing information defining a temporal relationship among the plurality of peaks.

90. The coded signal processor of claim 89, wherein the coded signal processor is in communication with a plurality of antennas and comprises a plurality of threshold detectors, wherein a threshold detector corresponds to each antenna and further comprising:

a timing reconciliation device for determining a reference time based on timing information received from each of the threshold detectors.

91. The coded signal processor of claim 90, wherein the at least a first oblique projection operator comprises a plurality of oblique projection operators and further comprising:

a corresponding plurality of RAKE processors, in communication with the oblique projection operators and the timing reconciliation device, for aligning the plurality of multipath signal segments in at least one of time and phase based on magnitudes of the plurality of multipath signal segments and the reference time to form an aligned first signal.

92. The coded signal processor of claim 89, further comprising:

a RAKE processor that uses the timing information to align and scale the at least a first signal component to provide a RAKE output;

a correlator that determines a correlation function based on the RAKE output;

a second threshold detector that determines, based on the correlation function, a transmit time and symbol for the RAKE output; and a decoder that decodes a first signal corresponding to the at least a first signal component using the transmit time and symbol.

93. A coded signal processor, comprising:

at least a first oblique projection operator that projects a composite signal space spanned by a composite coded signal onto a first signal space spanned by a first signal component in the composite coded signal along a projection space that is parallel to a second signal space spanned by at least a second signal component in the composite coded signal to determine at least one parameter of the first signal component;

an antenna; and a receiver in communication with the antenna and the at least a first oblique projection operator, wherein the composite coded signal comprises noise and at least a portion of the noise is generated by the receiver.

94. The coded signal processor of claim 93, further comprising:

a first correlator that determines a hypothetical correlation function corresponding to the first signal component;

a first threshold detector that determines, based on the hypothetical correlation function, timing information related to the first signal component;

a RAKE processor that uses the timing information to align and scale the first signal component to provide a RAKE output;

a second correlator that determines a correlation function based on the RAKE output;

a second threshold detector that determines, based on the correlation function, a transmit time and symbol for the RAKE output; and a decoder that decodes a first signal corresponding to the first signal component using the transmit time and symbol.

95. A coded signal processor, comprising:

at least a first oblique projection operator that projects a composite signal space spanned by a composite coded signal onto a first signal space spanned by a first signal component in the composite coded signal along a projection space that is parallel to a second signal space spanned by at least a second signal component in the composite coded signal to determine at least one parameter of the first signal component, wherein the parameter is a time offset.

96. The coded signal processor of claim 95, further comprising:

a first correlator that determines a hypothetical correlation function corresponding to the first signal component;

a first threshold detector that determines, based on the hypothetical correlation function, timing information related to the first signal component;

a RAKE processor that uses the timing information to align and scale the first signal component to provide a RAKE output;

a second correlator that determines a correlation function based on the RAKE output;

a second threshold detector that determines, based on the correlation function, a transmit time and symbol for the RAKE output; and a decoder that decodes a first signal corresponding to the first signal component using the transmit time and symbol.

97. A method for processing a composite signal, comprising:

projecting a first composite signal space spanned by a first composite coded signal onto a first signal space spanned by a first signal component of the first composite coded signal along a projection space that is parallel to at least a second interference space spanned by at least a second signal component of the first composite coded signal to determine at least one parameter of the first signal component, wherein the parameter is a time offset.

98. The method of claim 97, further comprising:

aligning and scaling the first signal component to form an aligned first signal;

selecting a first transmit time and symbol for the aligned first signal;

generating an interference code corresponding to the aligned first signal;

determining a projection operator corresponding to the aligned first signal;

generating a correlation function corresponding to the aligned first signal;

determining at least one of a second transmit time and symbol for the aligned first signal; and based on the at least one of a second transmit time and symbol, decoding the aligned first signal.

99. A method for processing a composite signal, comprising:

projecting a first composite signal space spanned by a first composite coded signal onto a first signal space spanned by a first signal component of the first composite coded signal along a projection space that is parallel to at least a second interference space spanned by at least a second signal component of the first composite coded signal to determine at least one parameter of the first signal component, wherein the first signal component is attributable to at least a first emitter and the at least a second signal component is attributable to at least a second emitter other than the first emitter and wherein the first and second signal components are transmitted asynchronously.

100. The method of claim 99, wherein the projecting step comprises:

selecting a candidate symbol and trial time corresponding to the first signal component;

generating a candidate interference code corresponding to the first signal component;

determining a hypothetical projection operator corresponding to the first signal component;

generating a hypothetical correlation function corresponding to the first signal component; and threshold detecting the hypothetical correlation function to determine temporal locations of a plurality of peaks.

101. The method of claim 99, further comprising:

aligning and scaling the first signal component to form an aligned first signal;

selecting a first transmit time and symbol for the aligned first signal;

generating an interference code corresponding to the aligned first signal;

determining a projection operator corresponding to the aligned first signal;

generating a correlation function corresponding to the aligned first signal;

determining at least one of a second transmit time and symbol for the aligned first signal; and using the at least one of a second transmit time and symbol, decoding the aligned first signal.

102. A method for processing a composite signal, comprising:

projecting at least a first composite signal space spanned by at least a first composite coded signal onto at least a first signal space spanned by at least a first signal component of the at least a first composite coded signal along at least one projection space that is parallel to at least a second interference space spanned by at least a second signal component in the first composite coded signal to determine at least one parameter of the at least a first signal component, wherein the at least a first signal component comprises a plurality of multipath signal segments; and aligning at least one of a received time and phase of the multipath signal segments to produce an aligned first signal.

103. The method of claim 102, further comprising:

scaling the multipath signal segments.

104. The method of claim 102, wherein each of the plurality of multipath signal segments was received at different times, and further comprising:

assigning to a portion of each of the plurality of multipath signal segments a respective time of receipt.

105. The method of claim 104, further comprising:

determining a reference time of receipt based on the respective times of receipt.

106. The method of claim 105, further comprising:

first, summing the plurality of multipath signal segments without regard to the differing times of receipt to form a summated peak magnitude;

second, aligning the plurality of multipath signal segments relative to the reference time of receipt to form a plurality of aligned signals;

third, scaling each of the multipath signal segments to form a plurality of scaled signals; and fourth, summing at least one of the aligned signals and the scaled signals.

107. The method of claim 102, wherein the projecting step comprises:

selecting a candidate symbol and trial time corresponding to the at least a first signal component;

generating a candidate interference code corresponding to the at least a first signal component;

determining a hypothetical projection operator corresponding to the at least a first signal component;

generating a hypothetical correlation function corresponding to the at least a first signal component; and threshold detecting the hypothetical correlation function to determine temporal locations of a plurality of peaks.

108. The method of claim 102, further comprising:

selecting a first transmit time and symbol for the aligned first signal;

generating an interference code corresponding to the aligned first signal;

determining a projection operator corresponding to the aligned first signal;

generating a correlation function corresponding to the aligned first signal;

determining at least one of a second transmit time and symbol for the aligned first signal; and using the at least one of a second transmit time and symbol, decoding the aligned first signal.

109. A method for processing a composite signal, comprising:

projecting at least a first composite signal space spanned by at least a first composite coded signal onto at least a first signal space spanned by at least a first signal component of the at least a first composite coded signal along at least one projection space that is parallel to at least a first interference space spanned by at least a second signal component of the at least a first composite coded signal to determine at least one parameter of the at least a first signal component, wherein the at least a first signal component comprises a plurality of multipath signal segments, each of the plurality of multipath signal segments being received at different times; and assigning to at least one of the plurality of multipath signal segments a respective time of receipt.

110. The method of claim 109, wherein the projecting step comprises:

selecting a candidate symbol and trial time corresponding to the at least a first signal component;

generating a candidate interference code corresponding to the at least a first signal component;

determining a hypothetical projection operator corresponding to the at least a first signal component;

generating a hypothetical correlation function corresponding to the at least a first signal component; and threshold detecting the hypothetical correlation function to determine temporal locations of a plurality of peaks.

111. The method of claim 109, further comprising:

aligning and scaling the at least a first signal component to form an aligned first signal;

selecting a first transmit time and symbol for the aligned first signal;

generating an interference code corresponding to the aligned first signal;

determining a projection operator corresponding to the aligned first signal;

generating a correlation function corresponding to the aligned first signal;

determining at least one of a second transmit time and symbol for the aligned first signal; and based on the at least one of a second transmit time and symbol, decoding the aligned first signal.

112. A method for processing a composite signal, comprising:

projecting a first composite signal space spanned by a first composite coded signal onto a first signal space spanned by a first signal component of the first composite coded signal along a projection space that is parallel to at least a first interference space spanned by at least a second signal component of the first composite coded signal to determine at least one parameter of the first signal component;

determining a time of transmission of the first signal component;

determining a received time for the first signal component; and repeating the projecting step using the time of transmission and the received time of the first signal component.

113. The method of claim 112, wherein the projecting step comprises:

selecting a candidate symbol and trial time corresponding to the first signal component;

generating a candidate interference code corresponding to the first signal component;

determining a hypothetical projection operator corresponding to the first signal component;

generating a hypothetical correlation function corresponding to the first signal component; and threshold detecting the hypothetical correlation function to determine temporal locations of a plurality of peaks.

114. The method of claim 112, wherein the projecting step comprises:

selecting a first symbol and first transmit time corresponding to the first signal component;

generating a first candidate interference code corresponding to the first signal component;

determining a first hypothetical projection operator corresponding to the first signal component;

generating a first hypothetical correlation function corresponding to the first signal component; and threshold detecting the first hypothetical correlation function to determine temporal locations of a plurality of peaks.

115. A method for processing a coded signal, the coded signal being decomposable into at least a first signal component, comprising:

projecting obliquely at least one signal space spanned by the coded signal onto at least a first signal space spanned by the at least a first signal component to determine at least one parameter of the at least a first signal component, wherein the at least a first signal component comprises a plurality of multipath signal segments; and aligning at least one of a received time and phase of the multipath signal segments to produce an aligned first signal.

116. The method of claim 115, further comprising:

selecting a first transmit time and symbol for the aligned first signal;

generating an interference code corresponding to the aligned first signal;

determining a projection operator corresponding to the aligned first signal;

generating a correlation function corresponding to the aligned first signal;

determining at least one of a second transmit time and symbol for the aligned first signal; and based on the at least one of a second transmit time and symbol, decoding the aligned first signal.

117. The method of claim 115, wherein the projecting step comprises:

selecting a candidate symbol and trial time corresponding to the at least a first signal component;

generating a candidate interference code corresponding to the at least a first signal component;

generating a candidate interference code corresponding to the at least a first signal component;

determining a hypothetical projection operator corresponding to the at least a first signal component;

generating a hypothetical correlation function corresponding to the at least a first signal component; and threshold detecting the hypothetical correlation function to determine the temporal locations of a plurality of peals.

118. A method for processing a coded signal, the coded signal being decomposable into at least a first signal component, comprising:

projecting obliquely at least one signal space spanned by the coded signal onto at least a first signal space spanned by the at least a first signal component to determine at least one parameter of the at least a first signal component, wherein the at least a first signal component comprises a plurality of multipath signal segments; and scaling the multipath signal segments.

119. The method of claim 118, further comprising:

aligning the multipath signal segments to form an aligned first signal;

selecting a first transmit time and symbol for the aligned first signal;

generating an interference code corresponding to the aligned first signal;

determining a projection operator corresponding to the aligned first signal;

generating a correlation function corresponding to the aligned first signal;

determining at least one of a second transmit time and symbol for the aligned first signal; and using the at least one of a second transmit time and symbol, decoding the aligned first signal.

120. A method for processing at least one coded signal, the at least one coded signal being decomposable into at least a first signal component, comprising:

projecting obliquely at least one signal space spanned by the at least one coded signal onto at least a first signal space spanned by the at least a first signal component to determine at least one parameter of the at least a first signal component, wherein the at least a first signal component comprises a plurality of multipath signal segments, each of the plurality of multipath signal segments being received at different times; and assigning to at least one of the plurality of multipath signal segments a respective time of receipt.

121. The method of claim 120, further comprising:

determining a reference time of receipt based on the at least one assigned respective time of receipt.

122. The method of claim 121, further comprising:

first, summing the plurality of multipath signal segments without regard to the differing times of receipt to form a summated peak magnitude;

second, aligning the plurality of multipath signal segments relative to the reference time of receipt to form a plurality of aligned signals;

third, scaling each of the multipath signal segments to form a plurality of scaled signals; and fourth, summing at least one of the aligned signals and the scaled signals.

123. The method of claim 120, wherein the projecting step comprises:

selecting a candidate symbol and trial time corresponding to the at least a first signal component;

generating a candidate interference code corresponding to the at least a first signal component;

determining a hypothetical projection operator corresponding to the at least a first signal component;

generating a hypothetical correlation function corresponding to the at least a first signal component; and threshold detecting the hypothetical correlation function to detemine temporal locations of a plurality of peaks.

124. A method for processing a coded signal, the coded signal being decomposable into at least a first signal component, comprising:

projecting obliquely a signal space spanned by the coded signal onto a first signal space spanned by the first signal component to determine at least one parameter of the first signal component;

determining a time of transmission of the first signal component;

determining a received time of the first signal component; and repeating the projecting step using at least one of the time of transmission and the received time.

125. The method of claim 124, further comprising:

aligning and scaling the first signal component to form an aligned first signal;

selecting a first symbol for the aligned first signal;

generating an interference code corresponding to the aligned first signal;

determining a projection operator corresponding to the aligned first signal;

generating a correlation function corresponding to the aligned first signal;

determining a second transmit time and symbol for the aligned first signal; and using the at least one of a second transmit time and symbol, decoding the aligned first signal.

126. The method of claim 124, wherein the projecting step comprises:

selecting a candidate symbol and trial time corresponding to the first signal component;

generating a candidate interference code corresponding to the first signal component;

determining a hypothetical projection operator corresponding to the first signal component;

generating a hypothetical correlation function corresponding to the first signal component; and threshold detecting the hypothetical correlation function to determine temporal locations of a plurality of peaks.

127. A method for processing a coded signal, the coded signal being decomposable into at least a first signal component, comprising:

projecting obliquely a signal space spanned by the coded signal onto a first signal space spanned by the first signal component to determine at least one parameter of the first signal component, wherein the first signal component is attributable to a first emitter, wherein the coded signal includes at least a second signal component attributable to at least a second emitter different from the first emitter, and wherein at least a portion of the projecting step is performed according to the following mathematical expression:

$$(I-S(S^TS)^{-1}S^T)H(H^T(I-S(S^TS)^{-1}S^T)H)^{-1}H^T(I-S(S^TS)^{-1}S^T),$$

where H is related to an interference code matrix of the first emitter, S is related to an interference code matrix of the at least a second emitter, $^T$ denotes the transpose operation, and I denotes the identity matrix.

128. The method of claim 127, further comprising:

aligning and scaling the first signal component to form an aligned first signal;

selecting a transmit time and symbol for the aligned first signal;

generating an interference code corresponding to the aligned first signal;

determining a projection operator corresponding to the aligned first signal;

generating a correlation function corresponding to the aligned first signal;

determining at least one of a transmit time and symbol for the aligned first signal; and using the at least one of a transmit time and symbol, decoding the aligned first signal.

129. The method of claim 127, wherein the projecting step comprises:

selecting a candidate symbol and trial time corresponding to the first signal component;

generating a candidate interference code corresponding to the first signal component;

determining a hypothetical projection operator corresponding to the first signal component;

generating a hypothetical correlation function corresponding to the first signal component; and threshold detecting the hypothetical correlation function to determine temporal locations of a plurality of peaks.

130. A system for receiving a signal, comprising:

a plurality of antennas each of which is adapted to receive a respective signal, each respective signal being decomposable into a respective first coded signal segment attributable to a first emitter; and a corresponding plurality of oblique projecting means for determining the respective first coded signal segment, the respective first coded signal segment spanning a corresponding first signal space, the plurality of oblique projecting means being in communication with the corresponding plurality of antennas and each of the plurality of oblique projecting means determining the respective first coded signal segment by projecting obliquely onto the corresponding first signal space a corresponding signal space spanned by the respective signal received by the corresponding antenna.

131. The system of claim 130, wherein at least one of the respective signals is also decomposable into a second signal segment attributable to an emitter other than the first emitter and wherein the corresponding signal space spanned by the respective signal is obliquely projected onto the corresponding first signal space along a corresponding projection space that is parallel to a second signal space spanned by the second signal segment.

132. The system of claim 130, including a corresponding plurality of RAKE processors in communication with the plurality of oblique projecting means, wherein each of the plurality of oblique projecting means produces a respective oblique projecting means output which is received as a RAKE processor input by each of the plurality of oblique projecting means' corresponding RAKE processor, the respective output of each of the plurality of oblique projecting means being delayed relative to one another, each of the plurality of RAKE processors being adapted to align and scale its respective input to produce a compensated output.

133. The system of claim 132, wherein the compensated output of each of the plurality of RAKE processors is delivered to a summing correlator.

134. The system of claim 130, further comprising:

a plurality of RAKE processing means, each RAKE processing means being in communication with a corresponding one of the plurality of oblique projecting means and producing a corresponding aligned first signal attributable to the first emitter; and a demodulating means, in communication with the plurality of RAKE processing means, for demodulating at least a portion of each corresponding aligned first signal, the at least a portion of each corresponding aligned first signal defining a respective aligned first space, the demodulating means determining the corresponding aligned first signals by obliquely projecting a respective signal space defined by a corresponding aligned first signal onto the respective aligned first space.

135. A method for processing a composite signal, the method comprising the steps of:

(a) providing a composite signal that is decomposable into a first coded signal portion that is attributable to a first emitter; and, (b) obliquely projecting a signal space corresponding to the composite signal onto a first signal space corresponding to the first coded signal portion to determine a parameter of the first coded signal portion, wherein the composite signal includes a second coded signal portion attributable to a second emitter other than the first emitter, wherein the obliquely projecting step determines the magnitude of the first coded signal portion and wherein the first and second coded signal portions are transmitted asynchronously.

136. The method of claim 135, wherein, in the obliquely projecting step, the signal space is obliquely projected onto the first signal space along a projection space that is parallel to a second signal space corresponding to the second coded signal portion.

137. A method for decomposing a composite signal having a first coded signal segment attributable to a first emitter, comprising:

obliquely projecting a signal space spanned by the composite signal onto a first signal space spanned by the first coded signal segment to determine a parameter of the first coded signal segment; and processing the parameter, wherein the composite signal includes a second coded signal segment attributable to a second emitter other than the first emitter and wherein the first and second coded signal segments are transmitted asynchronously.

138. The method of claim 137, wherein, in the obliquely projecting step, the signal space is obliquely projected onto the first signal space along a projection space that is parallel to a second signal space spanned by the second coded signal segment.

139. A system for processing an output signal of an antenna, comprising:

a plurality of oblique projection operators, corresponding to a plurality of antennas and being in communication therewith, each projection operator determining a respective signal component of a respective output signal of the corresponding antenna, the respective signal component being attributable to an emitter having an interference code matrix and each oblique projection operator determining a parameter of the respective signal component by projecting obliquely a signal space spanned by the respective output signal onto a signal space spanned by the respective signal component using an equation that includes the following mathematical expression:

$$(I-S(S^TS)^{-1}S^T)H(H^T(I-S(S^TS)^{-1}S^T)H)^{-1}H^T(I-S(S^TS)^{-1}S^T)$$

where H is related to an interference code matrix of the emitter, S is related to an interference code matrix of a second emitter, $^T$ denotes the transpose operation, and I denotes the identity matrix.

140. The system of claim 139, wherein at least a portion of a respective noise portion of the respective output signal is generated by a receiver.

141. The system of claim 139, wherein the system comprises a plurality of RAKE processors corresponding to the plurality of oblique projection operators, wherein each of the plurality of oblique projection operators produces a corresponding oblique projection operator output which is received as a RAKE processor input by each of the plurality of oblique projection operator's corresponding RAKE processor, the corresponding oblique projection operator output of each of the plurality of oblique projection operators being delayed relative to one another, each of the plurality of RAKE processors being adapted to align and scale their respective inputs to produce a corresponding compensated output.

142. The system of claim 141, wherein the corresponding compensated output of each of the plurality of RAKE processors is delivered to a second oblique projection operator in communication therewith for determining a refined oblique projection operator of each of the compensated outputs using the equation of claim 139.

* * * * *

UNITED STATES PATENT AND TRADEMARK OFFICE
CERTIFICATE OF CORRECTION

| | | |
|---|---|---|
| PATENT NO. | : 6,430,216 B1 | Page 1 of 1 |
| DATED | : August 6, 2002 | |
| INVENTOR(S) | : Kober et al. | |

It is certified that error appears in the above-identified patent and that said Letters Patent is hereby corrected as shown below:

<u>Title page,</u>
Item [56], References Cited, FOREIGN PATENT DOCUMENTS, please add the following:
-- European Patent No. 610989
European Patent No. 558910 --

Signed and Sealed this

Eighteenth Day of November, 2003

JAMES E. ROGAN
*Director of the United States Patent and Trademark Office*